United States Patent
Hua et al.

(10) Patent No.: US 12,309,772 B2
(45) Date of Patent: May 20, 2025

(54) METHOD AND DEVICES FOR DETERMINING RESOURCES

(71) Applicant: HUAWEI TECHNOLOGIES CO., LTD., Guangdong (CN)

(72) Inventors: Meng Hua, Shanghai (CN); Hai Wu, Beijing (CN); Yi Long, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 525 days.

(21) Appl. No.: 17/509,569

(22) Filed: Oct. 25, 2021

(65) Prior Publication Data
US 2022/0046680 A1 Feb. 10, 2022

Related U.S. Application Data

(63) Continuation of application No. PCT/CN2020/081859, filed on Mar. 27, 2020.

(30) Foreign Application Priority Data

Apr. 26, 2019 (CN) .......................... 201910346044.2
Aug. 16, 2019 (CN) .......................... 201910760333.7

(51) Int. Cl.
*H04W 72/1273* (2023.01)
*H04W 72/23* (2023.01)

(52) U.S. Cl.
CPC ....... *H04W 72/1273* (2013.01); *H04W 72/23* (2023.01)

(58) Field of Classification Search
CPC .............. H04W 72/1273; H04W 72/23; H04L 5/0053; H04L 5/0044; H04L 5/0048; H04L 5/0007
See application file for complete search history.

(56) References Cited

U.S. PATENT DOCUMENTS 10,064,200 B2    8/2018  Pourahmadi et al.
2015/0327226 A1* 11/2015  Cheng .................. H04L 5/0044
                                                        370/329
(Continued)

FOREIGN PATENT DOCUMENTS

CN    103813468 A    5/2014
CN    104186019 A    12/2014
(Continued)

OTHER PUBLICATIONS

Office Action issued in Indian Application No. 202127048257 on Mar. 21, 2022, 7 pages.
Extended European Search Report issued in European Application No. 20794450.5 on May 17, 2022, 20 pages.
Nokia et al., "Resource sharing between PDCCH and PDSCH in NR," 3GPP TSG-RAN WG1 Ad Hoc Meeting #2, R1-1710983, Qingdao, China, Jun. 27-30, 2017, 7 pages.
(Continued)

*Primary Examiner* — Omar J Ghowrwal
*Assistant Examiner* — Chhian (Amy) Ling
(74) *Attorney, Agent, or Firm* — Fish & Richardson P.C.

(57) ABSTRACT

The present disclosure relates to communication methods. In one example method, a terminal device determines a first resource based on configuration information from a network device, where the first resource is a resource that cannot be used to transmit a downlink data channel and a demodulation reference signal of the downlink data channel. The terminal device determines a second resource based on downlink control information from the network device, where the second resource includes a resource used to transmit the downlink data channel and the demodulation reference signal of the downlink data channel. The terminal device determines a third resource based on the first resource and the second resource, where the third resource is a resource that is in the second resource and that is used to transmit the downlink data channel and the demodulation reference signal of the downlink data channel.

20 Claims, 13 Drawing Sheets

(56) References Cited

U.S. PATENT DOCUMENTS

| | | | | |
|---|---|---|---|---|
| 2017/0149543 | A1* | 5/2017 | Ang | H04L 5/0053 |
| 2017/0317808 | A1 | 11/2017 | You et al. | |
| 2018/0227922 | A1 | 8/2018 | Lee et al. | |
| 2019/0082403 | A1 | 3/2019 | Lee et al. | |
| 2019/0082427 | A1* | 3/2019 | Kim | H04W 72/23 |
| 2019/0274091 | A1* | 9/2019 | Tang | H04W 72/53 |
| 2019/0379506 | A1* | 12/2019 | Cheng | H04W 88/06 |
| 2019/0387501 | A1* | 12/2019 | Park | H04L 5/005 |
| 2020/0067676 | A1* | 2/2020 | Yi | H04W 72/0446 |
| 2020/0163078 | A1* | 5/2020 | Jiang | H04L 27/26 |
| 2022/0046694 | A1* | 2/2022 | Park | H04W 76/27 |

FOREIGN PATENT DOCUMENTS

| | | | |
|---|---|---|---|
| CN | 105634708 | A | 6/2016 |
| CN | 106559194 | A | 4/2017 |
| CN | 108111291 | A | 6/2018 |
| CN | 104186017 | B | 11/2018 |
| CN | 109150460 | A | 1/2019 |
| CN | 109152023 | A | 1/2019 |
| CN | 109586868 | A | 4/2019 |
| KR | 20190027705 | A | 3/2019 |
| WO | 2017057989 | A1 | 4/2017 |
| WO | 2018012550 | A1 | 1/2018 |
| WO | 2018169320 | A1 | 9/2018 |
| WO | 2018201942 | A1 | 11/2018 |
| WO | 2019005560 | A1 | 1/2019 |

OTHER PUBLICATIONS

Samsung, "Remaining Issues on the NR Mobility," 3GPP TSG RAN WG1 Meeting NR#3, R1-1715915, Nagoya, Japan, Sep. 18-21, 2017, 13 pages.

Zte et al., "About dynamic resource sharing," 3GPP TSG RAN1 Meeting 91, R1-1719495, Reno, USA, 27 Nov. 27-Dec. 1, 2017, 5 pages.

MediaTek Inc., "Maintenance for rate matching," 3GPP TSG-RAN WG1 #96, R1-1903240, Athens, Greece, Feb. 25-Mar. 1, 2019, 2 pages.

Nokia et al., "Summary of offline on maintenance related to rate-matching in NR," 3GPP TSG-RAN WG1 #94, R1-1809846, Busan, South Korea, May 21-25, 2018, 11 pages.

Nokia et al., "Summary of open issues related to rate-matching in NR," 3GPP TSG-RAN WG1 AH1801, R1-1801039, Vancouver, Canada, Jan. 22-26, 2018, 8 pages.

Nokia et al., "Summary on maintenance related to rate-matching in NR," 3GPP TSG-RAN WG1 #96, R1-1903464, Athens, Greece, Feb. 25-Mar. 1, 2019, 10 pages.

Office Action issued in Chinese Application No. 201910760333.7 on May 17, 2021, 12 pages (with English translation).

PCT International Search Report and Written Opinion issued in International Application No. PCT/CN2020/081859 on Jun. 17, 2020, 17 pages (with English translation).

Samsung et al., "Multiplexing NR-PDCCH and PDSCH," 3GPP TSG RAN WG1 Meeting #89, R1-1707993, Hangzhou, China, May 15-19, 2017, 5 pages.

* cited by examiner

| 0 | 1 | 2 | 3 | 4 | 5 | 6 | 7 | 8 | 9 | 10 | 11 | 12 | 13 |

| 0 | 1 | 2 | 3 | 4 | 5 | 6 | 7 | 8 | 9 | 10 | 11 | 12 | 13 |

| 0 | 1 | 2 | 3 | 4 | 5 | 6 | 7 | 8 | 9 | 10 | 11 | 12 | 13 |

METHOD AND DEVICES FOR DETERMINING RESOURCES

CROSS-REFERENCE TO RELATED APPLICATIONS

This application is a continuation of International Application No. PCT/CN2020/081859, filed on Mar. 27, 2020, which claims priority to Chinese Patent Application No. 201910346044.2, filed on Apr. 26, 2019 and claims priority to Chinese Patent Application No. 201910760333.7, filed on Aug. 16, 2019. All of the aforementioned patent applications are hereby incorporated by reference in their entireties.

TECHNICAL FIELD

This application relates to the field of communication technologies, and in particular, to a communication method, device, and system.

BACKGROUND

In an existing new radio (NR) system, a minimum frequency domain scheduling granularity of a physical downlink data channel (PDSCH) is a plurality of resource blocks (RB). For example, when a frequency domain resource scheduling type of the PDSCH is a type 0, the minimum frequency domain scheduling granularity of the PDSCH is a resource block group (RBG).

In addition, some time-frequency resources that cannot be used to transmit the PDSCH are further defined in the NR system. If the time-frequency resources intersect a time-frequency resource block determined by a terminal device based on downlink control information (DCI), time-frequency resources that intersect the time-frequency resource block are not used to transmit the PDSCH. In addition, to avoid complexity of channel estimation, the protocol specifies that the terminal device is not expected to handle a case in which a demodulation reference signal (DMRS) of the PDSCH overlaps or even partially overlaps with the resources that cannot be used to transmit the PDSCH (a UE is not expected to handle the case where PDSCH DMRS REs are overlapping, even partially, with any REs not available for PDSCH).

However, as shown in FIG. 1a, if resources of N RBs defined by the NR system in one RBG cannot be used to transmit the PDSCH, and the entire RBG is not scheduled, other RB resources in the RBG other than the N RB resources are wasted. If the RBG is scheduled, a network device needs to configure all resources of the RBG to the terminal device by using the DCI, and indicate the resources of the N RBs that cannot be used to transmit the PDSCH. In this case, the terminal device may learn, based on indication information, the resources of the N RBs that cannot be used to transmit the PDSCH. However, the protocol specifies that the terminal device is not expected to handle the case that the DMRS of the PDSCH overlaps the resources that cannot be used to transmit the PDSCH, therefore, the terminal device still considers that the DMRS exists at a position at which the DMRS is transmitted. This obviously affects channel estimation and noise estimation, and affects reception performance of the PDSCH.

SUMMARY

Embodiments of this application provide a communication method, device, and system, to improve resource utilization without affecting reception performance of a downlink data channel.

To achieve the foregoing objectives, the following technical solutions are used in the embodiments of this application.

According to a first aspect, a communication method is provided. The method includes: A terminal device receives configuration information from a network device. The terminal device receives downlink control information from the network device. The terminal device determines a first resource based on the configuration information, where the first resource is a resource that cannot be used to transmit a downlink data channel and a demodulation reference signal of the downlink data channel. The terminal device determines a second resource based on the downlink control information, where the second resource includes a resource used to transmit the downlink data channel and the demodulation reference signal of the downlink data channel. The terminal device determines a third resource based on the first resource and the second resource, where the third resource is a resource that is in the second resource and that is used to transmit the downlink data channel and the demodulation reference signal of the downlink data channel. The terminal device receives, on the third resource, the downlink data channel and the demodulation reference signal of the downlink data channel from the network device. Based on this solution, in the solution, the first resource is a resource that cannot be used to transmit the downlink data channel and the demodulation reference signal of the downlink data channel, the second resource includes the resource used to transmit the downlink data channel scheduled by DCI and the demodulation reference signal of the downlink data channel, and the third resource is the resource that is in the second resource and that is used to transmit the downlink data channel and the demodulation reference signal of the downlink data channel. Therefore, when a minimum frequency domain scheduling granularity of the downlink data channel is a plurality of RBs, the plurality of RBs may be scheduled, and the downlink data channel and the demodulation reference signal of the downlink data channel are received or transmitted only on the resource that is in the second resource and that is used to transmit the downlink data channel and the demodulation reference signal of the downlink data channel (namely, the third resource). In this way, resource utilization can be improved without affecting reception performance of the downlink data channel.

In a possible design, that the terminal device determines a first resource based on the configuration information includes: The terminal device determines the first resource based on the configuration information and the downlink control information. In other words, in this embodiment of this application, when determining the first resource based on the configuration information, the terminal device may determine the first resource based on the downlink control information, to better meet a scheduling requirement of the downlink data channel.

According to a second aspect, a communication method is provided. The method includes: A network device sends configuration information to a terminal device, where the configuration information is used to determine a first resource, and the first resource is a resource that cannot be used to transmit a downlink data channel and a demodulation reference signal of the downlink data channel. The network device sends downlink control information to the terminal device, where the downlink control information is used to determine a second resource, and the second resource includes a resource used to transmit the downlink data channel and the demodulation reference signal of the downlink data channel. The network device determines a third resource based on the first resource and the second resource, where the third resource is a resource that is in the second resource and that is used to transmit the downlink data channel and the demodulation reference signal of the downlink data channel. The network device transmits, on the third resource, the downlink data channel and the demodulation reference signal of the downlink data channel to the terminal device. Based on this solution, in the solution, the first resource is a resource that cannot be used to transmit the downlink data channel and the demodulation reference signal of the downlink data channel, the second resource includes the resource used to transmit the downlink data channel scheduled by DCI and the demodulation reference signal of the downlink data channel, and the third resource is the resource that is in the second resource and that is used to transmit the downlink data channel and the demodulation reference signal of the downlink data channel. Therefore, when a minimum frequency domain scheduling granularity of the downlink data channel is a plurality of RBs, the plurality of RBs may be scheduled, and the downlink data channel and the demodulation reference signal of the downlink data channel are received or transmitted only on the resource that is in the second resource and that is used to transmit the downlink data channel and the demodulation reference signal of the downlink data channel (namely, the third resource). In this way, resource utilization can be improved without affecting reception performance of the downlink data channel.

In a possible design, the downlink control information is further used to determine the first resource. In other words, in this embodiment of this application, when determining the first resource based on the configuration information, the terminal device may determine the first resource based on the downlink control information, to better meet a scheduling requirement of the downlink data channel.

With reference to the first aspect or the second aspect, in a possible design, the configuration information includes indication information of a frequency domain resource in the first resource; and a time domain resource in the first resource includes all time domain resources within a validity period of the first resource. In other words, in this embodiment of this application, only the frequency domain resource in the first resource may be configured. The time domain resource in the first resource is all the time domain resources within the validity period of the first resource by default (for example, as specified in the protocol).

With reference to the first aspect or the second aspect, in a possible design, the configuration information includes indication information of a frequency domain resource in the first resource and indication information of a time domain resource in the first resource, and the indication information of the time domain resource is used to indicate that the time domain resource in the first resource includes all time domain resources within a validity period of the first resource. In other words, in this embodiment of this application, both the frequency domain resource and the time domain resource in the first resource may be configured, and the time domain resource in the first resource is configured as all the time domain resources within the validity period of the first resource.

With reference to the first aspect or the second aspect, in a possible design, the configuration information is represented by using M rate match patterns, and M is a positive integer less than or equal to a first set value. For example, the configuration information is represented by using one rate match pattern, or the configuration information is represented by using a limited quantity of rate match patterns.

With reference to the first aspect or the second aspect, in a possible design, a first rate match pattern in the M rate match patterns includes S segments of frequency domain resources, and S is a positive integer less than or equal to a second set value. For example, the first rate match pattern in the M rate match patterns includes one segment of frequency domain resources; or the first rate match pattern in the M rate match patterns includes a limited quantity of segments of frequency domain resources.

With reference to the first aspect or the second aspect, in a possible design, the frequency domain resource in the first resource is N segments of frequency domain resources, and N is a positive integer less than or equal to a third set value. For example, the frequency domain resource in the first resource is one segment of frequency domain resources; or the frequency domain resource in the first resource is a plurality of segments of frequency domain resources.

With reference to the first aspect or the second aspect, in a possible design, the first resource is a resource other than resources corresponding to at least one group of rate match patterns, and the resources corresponding to the at least one group of rate match patterns are resources that are indicated by the downlink control information and that cannot be used to transmit the downlink data channel.

With reference to the first aspect or the second aspect, in a possible design, the downlink data channel belongs to a downlink data channel whose mapping type is a type A. In other words, only a demodulation reference signal of the downlink data channel whose mapping type is the type A may overlap the resources that cannot be used to transmit the downlink data channel, and a demodulation reference signal of a downlink data channel whose mapping type is a type B cannot overlap the resources that cannot be used to transmit the downlink data channel. In this case, for processing of the downlink data channel whose mapping type is the type B, refer to a solution of the existing protocol. Details are not described herein again.

With reference to the first aspect or the second aspect, in a possible design, the downlink data channel belongs to a downlink data channel whose mapping type is the type B and whose duration time domain resource length is a fourth set value. In other words, only a demodulation reference signal of the downlink data channel whose mapping type is the type B and whose duration time domain resource length is the fourth set value may overlap the resources that cannot be used to transmit the downlink data channel. A demodulation reference signal of a downlink data channel whose mapping type is the type B and whose duration time domain resource length is a value other than the fourth set value cannot overlap the resources that cannot be used to transmit the downlink data channel. In this case, for processing of the downlink data channel whose mapping type is the type B and whose duration time domain resource length is the value other than the fourth set value, refer to a solution in the existing protocol. Details are not described herein again.

With reference to the first aspect or the second aspect, in a possible design, when the demodulation reference signal of the downlink data channel is of a double-symbol mode, the demodulation reference signal of the double-symbol mode includes at least one group of double-symbol demodulation reference signals. If a fourth resource includes a first demodulation reference signal symbol corresponding to one group of double-symbol demodulation reference signals on one resource block, but does not include a second demodulation reference signal symbol corresponding to the group of double-symbol demodulation reference signals on the resource block, the demodulation reference signal of the downlink data channel cannot be transmitted on the second demodulation reference signal symbol. The fourth resource is an intersection of the first resource and the second resource. Optionally, the downlink data channel cannot be transmitted on the second demodulation reference signal symbol.

With reference to the first aspect or the second aspect, in a possible design, the first resource includes one symbol in time domain, and all resource blocks on one bandwidth part BWP in frequency domain or all resource blocks on one carrier; or the first resource includes one resource block in frequency domain and all symbols in time domain. Alternatively, if the first resource includes one resource block in the frequency domain and a symbol in the time domain, it is determined that the first resource includes the symbol in the time domain, and all resource blocks on one bandwidth part BWP in the frequency domain or all resource blocks on one carrier; or the first resource includes the resource block in the frequency domain and all symbols in the time domain.

With reference to the first aspect or the second aspect, in a possible design, if the resource that is in the second resource and that is used to transmit the demodulation reference signal of the downlink data channel overlaps the first resource, the terminal device or the network device may determine a demodulation reference signal of a downlink data channel that cannot be transmitted within a frequency domain range of an overlapping resource and within duration of the second resource. Optionally, the terminal device or the network device may determine a downlink data channel that cannot be transmitted within the frequency domain range of the overlapping resource and within the duration of the second resource.

With reference to the first aspect or the second aspect, in a possible design, if the resource that is in the second resource and that is used to transmit the demodulation reference signal of the downlink data channel overlaps the first resource, the terminal device or the network device may determine a demodulation reference signal of a downlink data channel that cannot be transmitted within a time domain range of the overlapping resource and within a frequency domain range of the second resource. Optionally, the terminal device or the network device may determine a downlink data channel that cannot be transmitted within the time domain range of the overlapping resource and within the frequency domain range of the second resource.

According to a third aspect, a communication apparatus is provided, to implement the foregoing methods. The communication apparatus may be the terminal device in the first aspect or a chip system that implements a function of the terminal device. Alternatively, the communication apparatus may be the network device in the second aspect or a chip system that implements a function of the network device. The communication apparatus includes a module, a unit, or a means for implementing the methods. The module, the unit, or the means may be implemented by hardware or software, or by corresponding software executed by hardware. The hardware or the software includes one or more modules or units corresponding to the function.

According to a fourth aspect, a communication apparatus is provided, and includes a processor and a memory, where the memory is configured to store computer instructions; and when the processor executes the instructions, the communication apparatus is enabled to perform the method in any one of the foregoing aspects. The communication apparatus may be the terminal device in the first aspect or a chip system that implements a function of the terminal device. Alternatively, the communication apparatus may be the network device in the second aspect or a chip system that implements a function of the network device.

According to a fifth aspect, a communication apparatus is provided, and includes a processor, where the processor is configured to: couple to a memory; and after reading instructions in the memory, perform the method in any one of the foregoing aspects according to the instructions. The communication apparatus may be the terminal device in the first aspect or a chip system that implements a function of the terminal device. Alternatively, the communication apparatus may be the network device in the second aspect or a chip system that implements a function of the network device.

According to a sixth aspect, a computer-readable storage medium is provided, where the computer-readable storage medium stores instructions; and when the instructions are run on a computer, the computer is enabled to perform the method in any one of the foregoing aspects.

According to a seventh aspect, a computer program product including instructions is provided, where when the computer program product is run on a computer, the computer is enabled to perform the method in any one of the foregoing aspects.

According to an eighth aspect, a communication apparatus (for example, the communication apparatus may be a chip or a chip system) is provided, and includes a processor, configured to implement the functions in any one of the foregoing aspects. In a possible design, the communication apparatus further includes a memory, where the memory is configured to store necessary program instructions and data. When the communication apparatus is the chip system, the communication apparatus may include a chip, or may include a chip and another discrete component.

For technical effects brought by any design manner of the third aspect to the eighth aspect, refer to technical effects brought by different design manners of the first aspect or the second aspect. Details are not described herein again.

According to a ninth aspect, a communication system is provided, where the communication system includes the terminal device in the foregoing aspects and the network device in the foregoing aspects.

DESCRIPTION OF EMBODIMENTS

Figure 1A:
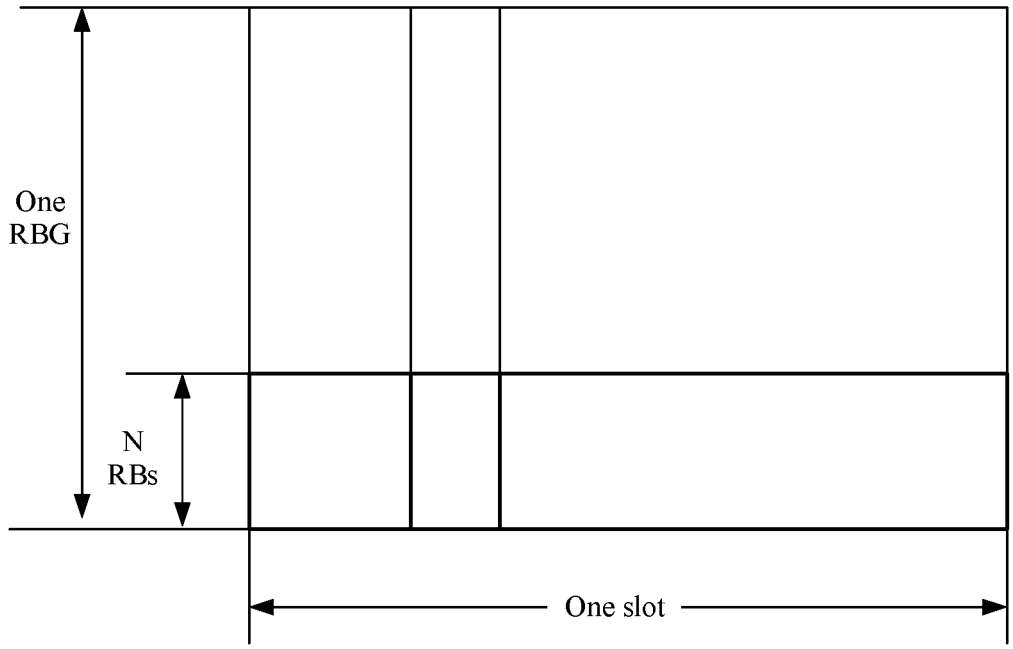
FIG. 1a is an existing schematic diagram of scheduling of a PDSCH.

For ease of understanding of technical solutions in embodiments of this application, the following first briefly describes technologies or nouns related to this application.

1. DCI

In an NR system, the DCI is carried on a physical downlink control channel (PDCCH) used to schedule a PDSCH. The DCI includes a frequency domain resource assignment information field, a time domain resource assignment information field, and a rate match indication field.

The frequency domain resource assignment information field is used to indicate a position of a frequency domain resource. The time domain resource assignment information field is used to indicate start symbols in time domain of the PDSCH, a quantity of consecutive symbols in time domain of the PDSCH, a mapping type of the PDSCH, and a position of a DMRS of the PDSCH. A terminal device may determine, based on frequency domain resource assignment information and time domain resource assignment information, a time-frequency resource block used to transmit the PDSCH and the DMRS of the PDSCH, and learn of the mapping type and the position of the DMRS that are of the PDSCH scheduled by the DCI. For related descriptions of the mapping type of the PDSCH, refer to content in the following embodiments. Details are not described herein again.

The rate match indication field is used to indicate whether a resource in a rate match pattern group can be used to transmit the PDSCH. For example, if a value of a bit corresponding to a rate match pattern group is 1, a resource in the rate match pattern group cannot be used to transmit the PDSCH. For related descriptions of the rate match pattern group, refer to content in the following embodiments. Details are not described herein again.

Certainly, the DCI may further include another field. This is not specifically limited in the embodiments of this application.

It should be noted that the symbol in the embodiments of this application may also be referred to as a time domain symbol. The symbol may be, for example, an orthogonal frequency division multiplexing symbol in a long term evolution (LTE) system or the NR system, or another symbol in a future system. Descriptions are uniformly provided herein, and details are not described below again.

2. Resources that Cannot be used to Transmit a PDSCH

Currently, the resources that cannot be used to transmit the PDSCH and that are defined in the NR system are classified into three types: a PDSCH resource mapping with resource block (RB) symbol level granularity, a PDSCH resource mapping with resource element (RE) level granularity, and a synchronization signal (SS)/physical broadcast channel (PBCH) (SSB) resource. The following embodiments of this application mainly relate to the PDSCH resource mapping with RB symbol level granularity, and do not relate to the PDSCH resource mapping with RE level granularity or the SSB resource. Descriptions are uniformly provided herein, and details are not described below again.

Figure 1B:
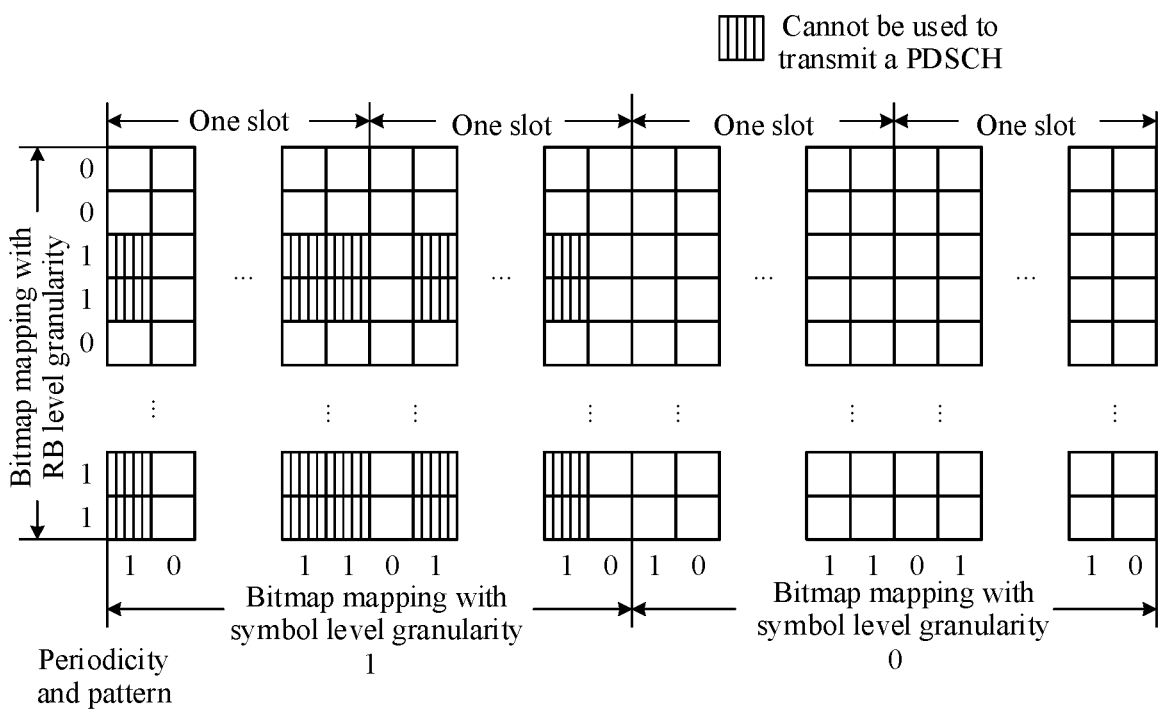
FIG. 1b is an existing schematic diagram of a rate match pattern.

3. PDSCH Resource Mapping with RB Symbol Level Granularity that Cannot be used to Transmit a PDSCH A maximum of four rate match patterns may be configured per bandwidth part (BWP) of one terminal device, and a maximum of four rate match patterns may be configured per serving cell that the terminal device accesses. Currently, one rate match pattern may include:

a pair of reserved resources configured by a network device, where the pair of reserved resources includes a bitmap mapping with RB level granularity that includes one RB and a bitmap mapping with symbol level granularity in a time unit that includes 12 or 14 OFDM symbols. If values of bits in the bitmap mapping with RB level granularity and the bitmap mapping with symbol level granularity are 1, it indicates that corresponding resources cannot be used to transmit the PDSCH. A periodicity and pattern may be configured for each pair of bitmap mapping with RB level granularity and bitmap mapping with symbol level granularity, and each bit in the periodicity and pattern corresponds to one bitmap mapping with symbol level granularity. If a value of a bit in the periodicity and pattern is 1, it indicates that a unit in which the bit is located has a pair of reserved resources. For example, it is assumed that values of bits in the periodicity and pattern are 10, values of bits in the bitmap mapping with RB level granularity are 00110 . . . 11, and values of bits in the bitmap mapping with symbol level granularity are 10 . . . 1101 . . . 10. In this case, a position of the corresponding resource that cannot be used to transmit the PDSCH may be shown in FIG. 1*b*.

It should be noted that in this embodiment of this application, the time unit that includes the 12 OFDM symbols or the 14 OFDM symbols is referred to as a subframe in the LTE system, corresponds to two slots in the LTE system, and corresponds to one slot in the NR system. The slot in the following embodiments of this application is described by using a slot of the NR system as an example. Descriptions are uniformly provided herein, and details are not described below again.

symbols S (a sequence number of the first symbol of the slot is 0, and so on) and quantities L of consecutive symbols (counting from a symbol S) are different for the two types of the PDSCH. Positions of DMRSs of the two types of the PDSCHs are also different. Table 2 shows the differences between S and L of the two types of PDSCHs.

TABLE 2

| PDSCH mapping | NCP | | | ECP | | |
|---|---|---|---|---|---|---|
| type | S | L | S + L | S | L | S + L |
| Type A | {0, 1, 2, 3} (note 1) | {3, ..., 14} | {3, ..., 14} | {0, 1, 2, 3} (note 1) | {3, ..., 12} | {3, ..., 12} |
| Type B | {0, ..., 12} | {2, 4, 7} | {2, ..., 14} | {0, ..., 10} | {2, 4, 6} | {2, ..., 12} |

Note (note):
S = 3 is applicable only if dmrs-typeA-position = 3 (S = 3 is applicable only if dmrs-TypeA-Position = 3)

4. Rate Match Pattern Group

A configured rate match pattern group (for example, a rate match pattern group 1 or a rate match pattern group 2) includes a resource set corresponding to a group of rate match patterns. Each rate match pattern group corresponds to a bit whose value is 1 in a rate match indication field in DCI carried on a PDCCH for scheduling a PDSCH. If a value of a bit corresponding to the rate match pattern group is 1, a resource in the resource set cannot be used to transmit the PDSCH. In addition, resources in a rate match pattern that is not included in any rate match pattern group are not used to transmit the PDSCH.

5. Frequency Domain Scheduling Granularity of a PDSCH

Currently, there are two frequency domain resource scheduling types for the PDSCH: a type 0 and a type 1.

When the frequency domain resource scheduling type of the PDSCH is the type 0, one BWP includes RBGs, and then a bitmap is used to indicate whether a resource of an RBG is assigned to a terminal device. Herein, an RBG size may be determined based on the following table, a BWP size, and a higher layer parameter RBG-size, where the RBG-size indicates whether the terminal device uses a configuration 1 or a configuration 2.

TABLE 1

| BWP size | Configuration 1 | Configuration 2 |
|---|---|---|
| 1-36 | 2 | 4 |
| 37-72 | 4 | 8 |
| 73-144 | 8 | 16 |
| 145-275 | 16 | 16 |

When the frequency domain resource scheduling type of the PDSCH is the type 1, one segment of consecutive virtual resource blocks (VRBs) in a downlink BWP is assigned to a terminal device. There are two mapping modes: an interleaving mapping mode and a non-interleaving mapping mode. In the non-interleaving mapping mode, a VRB is directly mapped to a physical resource block (PRB). In the interleaving mapping mode, interleaving is performed between VRBs and PRBs in a manner in which two rows or two columns are fixed, and an interleaving unit is two RBs or four RBs.

6. Time Domain Mapping Manner of a PDSCH

In the NR system, there are two mapping types for the PDSCH: a mapping type A and a mapping type B. Start symbols S (a sequence number of the first symbol of the slot is 0, and so on) and quantities L of consecutive symbols (counting from a symbol S) are different for the two types of the PDSCH.

It can be learned from Table 2 that when the normal cyclic prefix (CP) (NCP) is used (the extended CP (ECP) is similar), (1) a start symbol of the type A may any one of the first four symbols {0, 1, 2, 3}, and a start symbol of the type B may be any one of the first 13 symbols {0, . . . , 12}; and (2) a quantity of consecutive symbols of the type A may be any one of {3, . . . , 14}, and a quantity of consecutive symbols of the type B may be any one of {2, 4, 7}.

Figures 1C, 1D, 1E, 2:
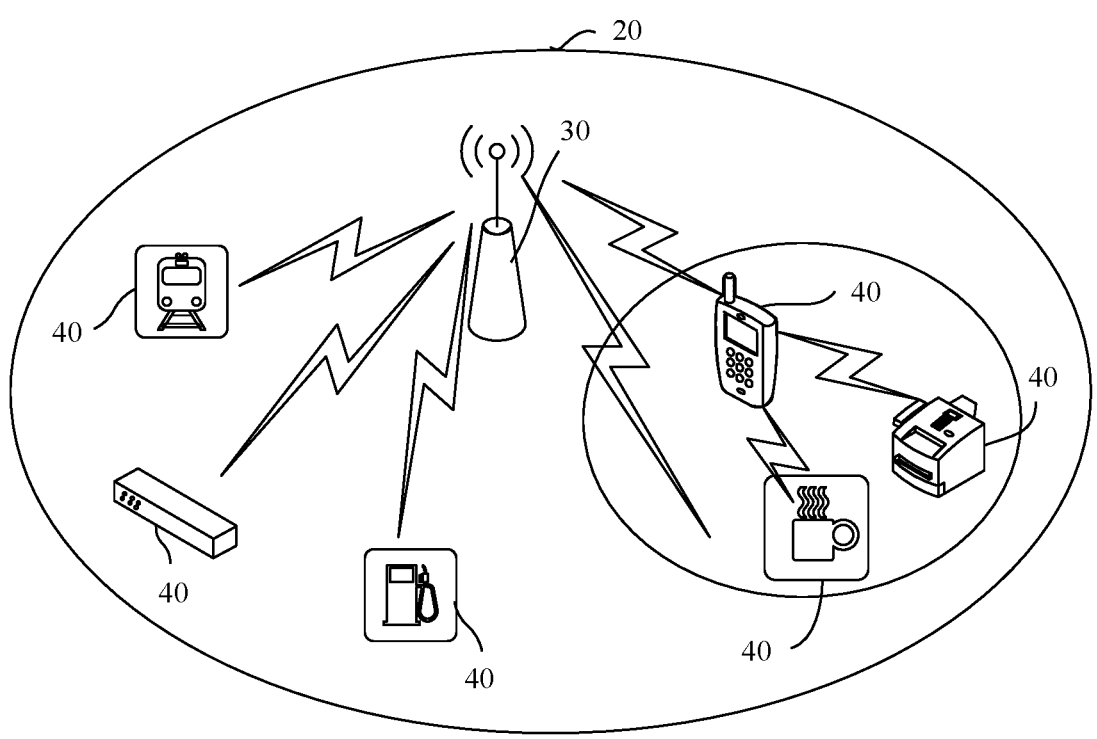
FIG. 1c is an existing schematic diagram 1 of mapping of a PDSCH.
FIG. 1d is an existing schematic diagram 2 of mapping of a PDSCH.
FIG. 1e is an existing schematic diagram 3 of mapping of a PDSCH.
FIG. 2 is a schematic diagram of an architecture of a communication system according to an embodiment of this application.

For example, the mapping type A is used as an example. It is assumed that the start symbol is 2 and the quantity of consecutive symbols is 11. In this case, the PDSCH may be mapped to symbols {2, 3, 4, 5, 6, 7, 8, 9, 10, 11, 12}, as shown in FIG. 1c.

Alternatively, for example, the mapping type B is used as an example. It is assumed that the start symbol is 4 and the quantity of consecutive symbols is 2. In this case, the PDSCH may be mapped to symbols {4, 5}, as shown in FIG. 1d.

Alternatively, for example, the mapping type B is used as an example. It is assumed that the start symbol is 8, and the quantity of consecutive symbols is 4. In this case, the PDSCH may be mapped to symbols {8, 9, 10, 11}, as shown in FIG. 1e.

In addition, it should be noted that for the mapping type A, a position of a symbol of the first DMRS may be determined based on the higher layer parameter dmrs-TypeA-Position, and the symbol of the first DMRS may be on a symbol 2 or a symbol 3. For the mapping type B, the symbol of the first DMRS is on the first symbol of the PDSCH. In addition, for scheduling of the two mapping types of the PDSCH, an additional DMRS symbol may be scheduled. Descriptions are uniformly provided herein, and details are not described below again.

7. Time Domain Mapping Manner of a DMRS of a PDSCH

In the NR system, there are two modes for DMRSs of the PDSCH: a single-symbol mode and a double-symbol mode. In the single-symbol mode, the DMRSs may be transmitted on one or more symbols, and the symbols for transmitting the DMRSs are not consecutive. In the double-symbol mode, the DMRSs may be transmitted on one or more groups of symbols. One group of DMRSs is transmitted on each group of symbols, and each group of DMRSs is transmitted on two consecutive OFDM symbols. Every two groups of symbols are not consecutive.

In the double-symbol mode, a group of DMRSs on two symbols in a terminal-side device are received, and then the group of DMRSs is used to perform channel estimation. Channel estimation cannot be performed if only a DMRS on a symbol is received.

It should be noted that an index of a symbol starts from 0, but a sequence number of the symbol starts from 1. In other words, the symbol whose index is 0 is the first symbol, a symbol whose index is 1 is the second symbol, and so on.

A reference point l and a position $l_0$ of the symbol of the first DMRS depend on the mapping type of the PDSCH. For the PDSCH whose mapping type is the type A, l is defined by using a start symbol of a slot, that is, $l_0=3$ or $l_0=2$ (determined based on the higher layer parameter). For the PDSCH whose mapping type is the type B, l is defined by using a start symbol of a scheduled PDSCH resource, that is, $l_0=0$.

Symbol duration of the DMRS $l_d$ is defined as: For the PDSCH whose mapping type is the type A, $l_d$ is duration from the first symbol of the slot to the last symbol of the scheduled PDSCH resource. For the PDSCH whose mapping type is the type B, $l_d$ is a quantity of OFDM symbols of the scheduled PDSCH resource.

It can be learned from the following Table 3 and Table 4 that the position $\bar{l}$ of the symbol (group) of the DMRS may be determined based on the mapping type of the PDSCH, the higher layer parameter dmrs-AdditionalPosition, and the duration of the PDSCH $l_d$.

The DMRS is placed on a symbol of $l=\bar{l}+l'$. In the single-symbol mode, $\bar{l}$ is one or more inconsecutive symbols, and l' is 0. In the double-symbol mode, $\bar{l}$ is one or more inconsecutive symbols, namely, the first symbol in each group of symbols of the DMRS, and l' may be 0 or 1 and corresponds to two consecutive symbols in the double-symbol mode.

In the single symbol mode, after channel estimation is performed by using each DMRS, a filtering operation (for example, Wiener filtering) may be performed on a result of estimating a plurality of channels, to obtain channel estimation on an RE of the PDSCH. In the double-symbol mode, after channel estimation is performed by using each group of DMRSs, the filtering operation may be performed on the result of estimating the plurality of channels, to obtain channel estimation on the RE of the PDSCH. Different quantities and different positions of DMRSs may correspond to different filtering parameters.

TABLE 4

| Symbol duration | Position $\bar{l}$ of a DMRS symbol (group) | | | | | |
|---|---|---|---|---|---|---|
| | PDSCH mapping type A dmrs-AdditionalPosition | | | PDSCH mapping type B dmrs-AdditionalPosition | | |
| $l_d$ | 0 | 1 | 2 | 0 | 1 | 2 |
| <4 | — | — | — | — | — | — |
| 4 | $l_0$ | $l_0$ | — | — | — | — |
| 5 | $l_0$ | $l_0$ | — | — | — | — |
| 6 | $l_0$ | $l_0$ | — | $l_0$ | $l_0$ | — |
| 7 | $l_0$ | $l_0$ | — | $l_0$ | $l_0$ | — |
| 8 | $l_0$ | $l_0$ | — | — | — | — |
| 9 | $l_0$ | $l_0$ | — | — | — | — |
| 10 | $l_0$ | $l_0$ and 8 | — | — | — | — |
| 11 | $l_0$ | $l_0$ and 8 | — | — | — | — |
| 12 | $l_0$ | $l_0$ and 8 | — | — | — | — |
| 13 | $l_0$ | $l_0$ and 10 | — | — | — | — |
| 14 | $l_0$ | $l_0$ and 10 | — | — | — | — |

Whether a value of $l_1$ in Table 3 is 11 or 12 is determined by the higher layer parameter.

8. Bandwidth Part

The BWP is introduced in the NR system. One BWP is one segment of consecutive RBs in one carrier. A plurality of downlink BWPs and a plurality of uplink BWPs may be configured on one carrier. However, at a time point, only one downlink active BWP and one uplink active BWP can exist. A downlink signal currently received by the terminal device is in the downlink active BWP, and an uplink signal currently transmitted by the terminal device is in the uplink active BWP.

The following describes the technical solutions in the embodiments of this application with reference to accompanying drawings in the embodiments of this application. In descriptions of this application, "/" represents an "or" relationship between associated objects unless otherwise specified. For example, A/B may represent A or B. The term "and/or" in this application is merely an association relationship for describing associated objects, and represents that three relationships may exist. For example, A and/or B may represent the following three cases: Only A exists, both A and B exist, and only B exists, where A and B each may be singular or plural. In addition, in the descriptions of this application, "a plurality of" means two or more than two unless otherwise specified. "At least one of the following items (pieces)" or a similar expression thereof means any

TABLE 3

| Symbol duration | Position $\bar{l}$ of a DMRS symbol (group) | | | | | | | |
|---|---|---|---|---|---|---|---|---|
| | PDSCH mapping type A dmrs-AdditionalPosition | | | | PDSCH mapping type B dmrs-AdditionalPosition | | | |
| $l_d$ | 0 | 1 | 2 | 3 | 0 | 1 | 2 | 3 |
| 2 | — | — | — | — | $l_0$ | $l_0$ | — | — |
| 3 | $l_0$ | $l_0$ | $l_0$ | $l_0$ | — | — | — | — |
| 4 | $l_0$ | $l_0$ | $l_0$ | $l_0$ | $l_0$ | $l_0$ | — | — |
| 5 | $l_0$ | $l_0$ | $l_0$ | $l_0$ | — | — | — | — |
| 6 | $l_0$ | $l_0$ | $l_0$ | $l_0$ | $l_0$ | $l_0$ and 4 | — | — |
| 7 | $l_0$ | $l_0$ | $l_0$ | $l_0$ | $l_0$ | $l_0$ and 4 | — | — |
| 8 | $l_0$ | $l_0$ and 7 | $l_0$ and 7 | $l_0$ and 7 | — | — | — | — |
| 9 | $l_0$ | $l_0$ and 7 | $l_0$ and 7 | $l_0$ and 7 | — | — | — | — |
| 10 | $l_0$ | $l_0$ and 9 | $l_0$, 6, and 9 | $l_0$, 6, and 9 | — | — | — | — |
| 11 | $l_0$ | $l_0$ and 9 | $l_0$, 6, and 9 | $l_0$, 6, and 9 | — | — | — | — |
| 12 | $l_0$ | $l_0$ and 9 | $l_0$, 6, and 9 | $l_0$, 5, 8, and 11 | — | — | — | — |
| 13 | $l_0$ | $l_0$ and $l_1$ | $l_0$ and 7 | $l_0$, 5, 8, and 11 | — | — | — | — |
| 14 | $l_0$ | $l_0$ and $l_1$ | $l_0$, 7, and 11 | $l_0$, 5, 8, and 11 | — | — | — | — | combination of these items, including any combination of singular items (pieces) or plural items (pieces). For example, at least one of a, b, or c may indicate: a, b, c, a and b, a and c, b and c, or a, b, and c, where a, b, and c may be singular or plural. In addition, to clearly describe the technical solutions in the embodiments of this application, in the embodiments of this application, terms such as "first" and "second" are used to distinguish between same objects or similar objects whose functions and purposes are basically the same. A person skilled in the art may understand that the terms such as "first" and "second" are not intended to limit a quantity or an execution sequence, and the terms such as "first" and "second" do not indicate a definite difference. In addition, in the embodiments of this application, words such as "example" or "for example" are used to represent giving an example, an illustration, or a description. Any embodiment or design solution described as an "example" or "for example" in the embodiments of this application should not be explained as being more preferred or having more advantages than another embodiment or design solution. Exactly, use of the words such as "example" or "for example" is intended to present a relative concept in a specific manner for ease of understanding.

The embodiments of this application is applicable to an LTE system or an NR system (which may also be referred to as a $5^{th}$ generation (5G) system), is also applicable to another future-oriented new system, or the like. This is not specifically limited in this embodiment of this application. In addition, terms "system" and "network" may be interchanged.

FIG. 2 shows a communication system 20 according to an embodiment of this application. The communication system 20 includes a network device 30 and one or more terminal devices 40 connected to the network device 30. Optionally, different terminal devices 40 may communicate with each other.

An example in which the network device 30 shown in FIG. 2 interacts with any one of the terminal devices 40 is used. In this embodiment of this application, the network device 30 is configured to send DCI and configuration information to the terminal device 40. The network device 30 is further configured to determine a third resource based on a first resource and a second resource, and transmit, on the third resource, a downlink data channel and a demodulation reference signal of the downlink data channel to the terminal device 40. The terminal device 40 is further configured to receive the DCI and the configuration information from the network device 30, determine the second resource based on the DCI, and determine the first resource based on the configuration information. The terminal device 40 is further configured to: determine the third resource based on the first resource and the second resource, and receive, on the third resource, the downlink data channel and the demodulation reference signal of the downlink data channel from the network device 30. The first resource is a resource that cannot be used to transmit the downlink data channel and the demodulation reference signal of the downlink data channel, the second resource includes a resource used to transmit the downlink data channel and the demodulation reference signal of the downlink data channel, and the third resource is a resource that is in the second resource and that is used to transmit the downlink data channel and the demodulation reference signal of the downlink data channel. A specific implementation of this solution is to be described in detail in subsequent method embodiments. Details are not described herein again. Based on this solution, in the solution, the first resource is the resource that cannot be used to transmit the downlink data channel and the demodulation reference signal of the downlink data channel, the second resource includes the resource used to transmit the downlink data channel scheduled by DCI and the demodulation reference signal of the downlink data channel, and the third resource is the resource that is in the second resource and that is used to transmit the downlink data channel and the demodulation reference signal of the downlink data channel. Therefore, when a minimum frequency domain scheduling granularity of the downlink data channel is a plurality of RBs, the plurality of RBs may be scheduled, and the downlink data channel and the demodulation reference signal of the downlink data channel are received or transmitted only on the resource that is in the second resource and that is used to transmit the downlink data channel and the demodulation reference signal of the downlink data channel (namely, the third resource). In this way, resource utilization can be improved without affecting reception performance of the downlink data channel.

Optionally, the network device 30 in this embodiment of this application is a device that enables the terminal device 40 to access a wireless network; and may be an evolved NodeB (eNB, or eNodeB) in an LTE system, a base station in an NR system or a future evolved public land mobile network (PLMN), a broadband network service gateway (BNG), an aggregation switch, a non-$3^{rd}$ generation partnership project (3GPP) access device, or the like. This is not specifically limited in this embodiment of this application. Optionally, the base station in this embodiment of this application may include different forms of base stations such as a macro base station, a micro base station (which is also referred to as a small cell), a relay station, or an access point. This is not specifically limited in this embodiment of this application.

Optionally, the terminal device 40 in this embodiment of this application may be a device configured to implement a wireless communication function, for example, a terminal or a chip that may be used in a terminal. The terminal may be user equipment (UE), an access terminal, a terminal unit, a terminal station, a mobile station, a remote station, a remote terminal, a mobile device, a wireless communication device, a terminal agent, a terminal apparatus, or the like in the LTE system, the NR system, or the future evolved PLMN. The access terminal may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a virtual reality (VR) terminal device, an augmented reality (AR) terminal device, a wireless terminal in industrial control, a wireless terminal in self-driving, a wireless terminal in telemedicine, a wireless terminal in a smart grid, a wireless terminal in transportation safety, a wireless terminal in a smart city, a wireless terminal in a smart home, or the like. The terminal may be movable or fixed.

Optionally, the network device 30 and the terminal device 40 in this embodiment of this application may also be referred to as communication apparatuses, and each may be a general-purpose device or a dedicated device. This is not specifically limited in this embodiment of this application.

Figure 3:
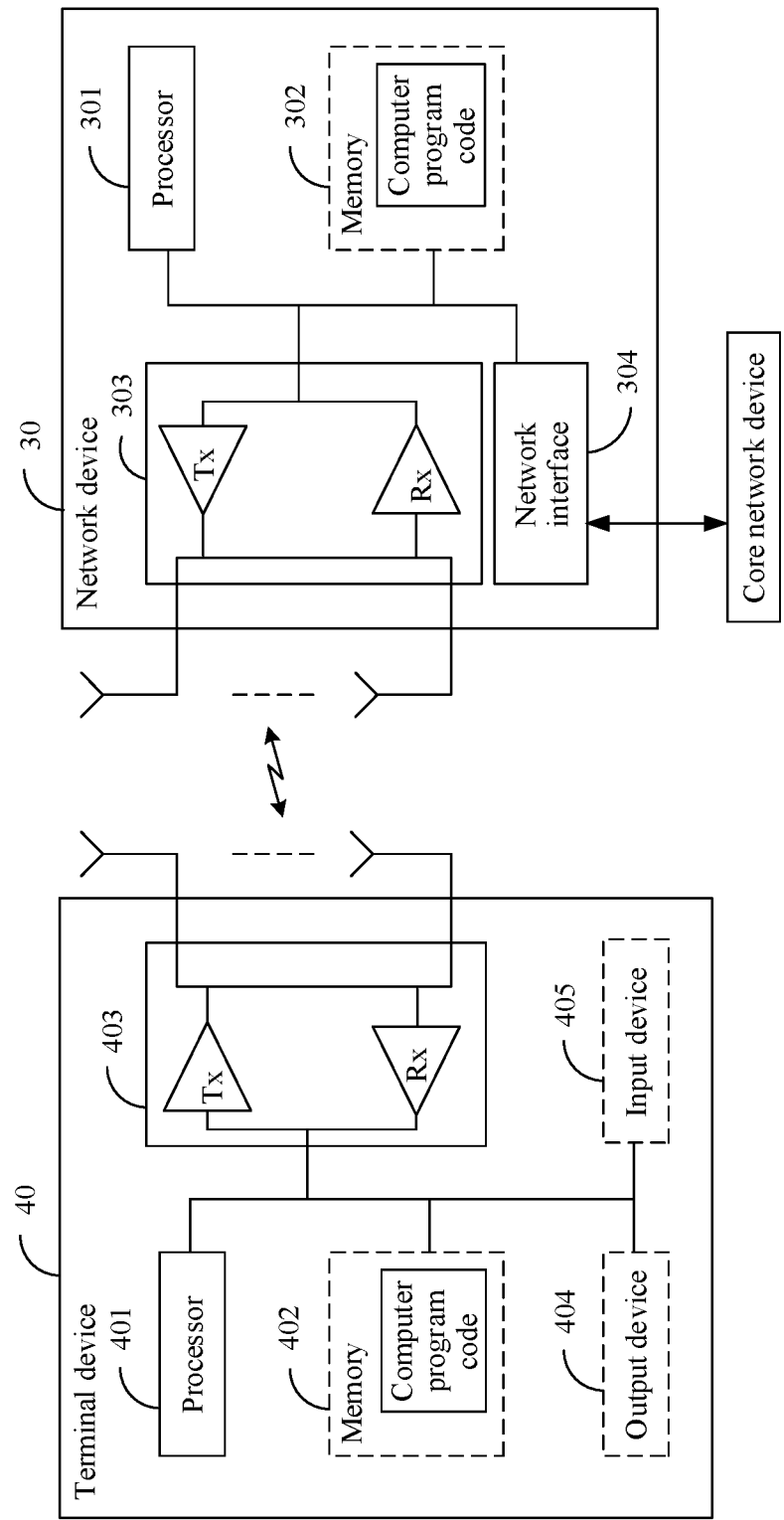
FIG. 3 is a schematic diagram of structures of a terminal device and a network device according to an embodiment of this application.

Optionally, FIG. 3 is a schematic diagram of structures of the network device 30 and the terminal device 40 according to this embodiment of this application.

The terminal device 40 includes at least one processor (an example in which the terminal device 40 includes one processor 401 is used for description in FIG. 3) and at least one transceiver (an example in which the terminal device 40 includes one transceiver 403 is used for description in FIG. 3). Optionally, the terminal device 40 may further include at least one memory (an example in which the terminal device 40 includes one memory 402 is used for description in FIG. 3), at least one output device (an example in which the terminal device 40 includes one output device 404 is used for description in FIG. 3), and at least one input device (an example in which the terminal device 40 includes one input device 405 is used for description in FIG. 3).

The processor 401, the memory 402, and the transceiver 403 are connected through a communication line. The communication line may include a path for transmitting information between the foregoing components.

The processor 401 may be a general-purpose central processing unit (CPU), a microprocessor, an application-specific integrated circuit (ASIC), or one or more integrated circuits configured to control program execution in the solutions provided in this application. In a specific implementation, in an embodiment, the processor 401 may also include a plurality of CPUs, and the processor 401 may be a single-core processor or a multi-core processor. The processor herein may be one or more devices, circuits, or processing cores for processing data (for example, computer program instructions).

The memory 402 may be an apparatus that has a storage function. The memory 402 may be a read-only memory (ROM) or another type of static storage device capable of storing static information and instructions, or a random access memory (RAM) or another type of dynamic storage device capable of storing information and instructions, or may be an electrically erasable programmable read-only memory (EEPROM), a compact disc read-only memory (CD-ROM) or another compact disc storage, optical disc storage (including a compressed optical disc, a laser disc, an optical disc, a digital versatile optical disc, a Blu-ray optical disc, or the like), a magnetic disk storage medium or another magnetic storage device, or any other medium capable of carrying or storing expected program code in a form of instructions or data structures and capable of being accessed by a computer. This is not limited thereto. The memory 402 may exist independently and be connected to the processor 401 through the communication line. The memory 402 may alternatively be integrated with the processor 401.

The memory 402 is configured to store computer-executable instructions for performing the solutions of this application, and execution is controlled by the processor 401. Specifically, the processor 401 is configured to execute the computer-executable instructions stored in the memory 402, to implement the communication method in the embodiments of this application.

Alternatively, optionally, in this embodiment of this application, the processor 401 may execute processing related functions in the communication method according to the following embodiments of this application, and the transceiver 403 is responsible for communication with another device or a communication network. This is not specifically limited in this embodiment of this application.

Optionally, the computer-executable instructions in this embodiment of this application may also be referred to as application program code or computer program code. This is not specifically limited in this embodiment of this application.

The transceiver 403 may be any type of apparatus using a transceiver, and is configured to communicate with another device or a communication network, for example, the Ethernet, a radio access network (RAN), or a wireless local area network (WLAN). The transceiver 403 includes a transmitter (Tx) and a receiver (Rx).

The output device 404 communicates with the processor 401, and can display information in a plurality of manners. For example, the output device 404 may be a liquid crystal display (LCD), a light emitting diode (LED) display device, a cathode ray tube (CRT) display device, or a projector.

The input device 405 communicates with the processor 401, and can receive input of a user in a plurality of manners. For example, the input device 405 may be a mouse, a keyboard, a touchscreen device, or a sensor device.

The network device 30 includes at least one processor (an example in which the network device 30 includes one processor 301 is used for description in FIG. 3), at least one transceiver (an example in which the network device 30 includes one transceiver 303 is used for description in FIG. 3), and at least one network interface (an example in which the network device 30 includes one network interface 304 is used for description in FIG. 3). Optionally, the network device 30 may further include at least one memory (an example in which the network device 30 includes one memory 302 is used for description in FIG. 3). The processor 301, the memory 302, the transceiver 303, and the network interface 304 are connected through a communication line. The network interface 304 is configured to connect to a core network device through a link (for example, an S1 interface), or connect to a network interface of another network device through a wired or wireless link (for example, an X2 interface) (not shown in FIG. 3). This is not specifically limited in this embodiment of this application. In addition, for descriptions of the processor 301, the memory 302, and the transceiver 303, refer to descriptions of the processor 401, the memory 402, and the transceiver 403 in the terminal device 40. Details are not described again herein.

Figure 4:
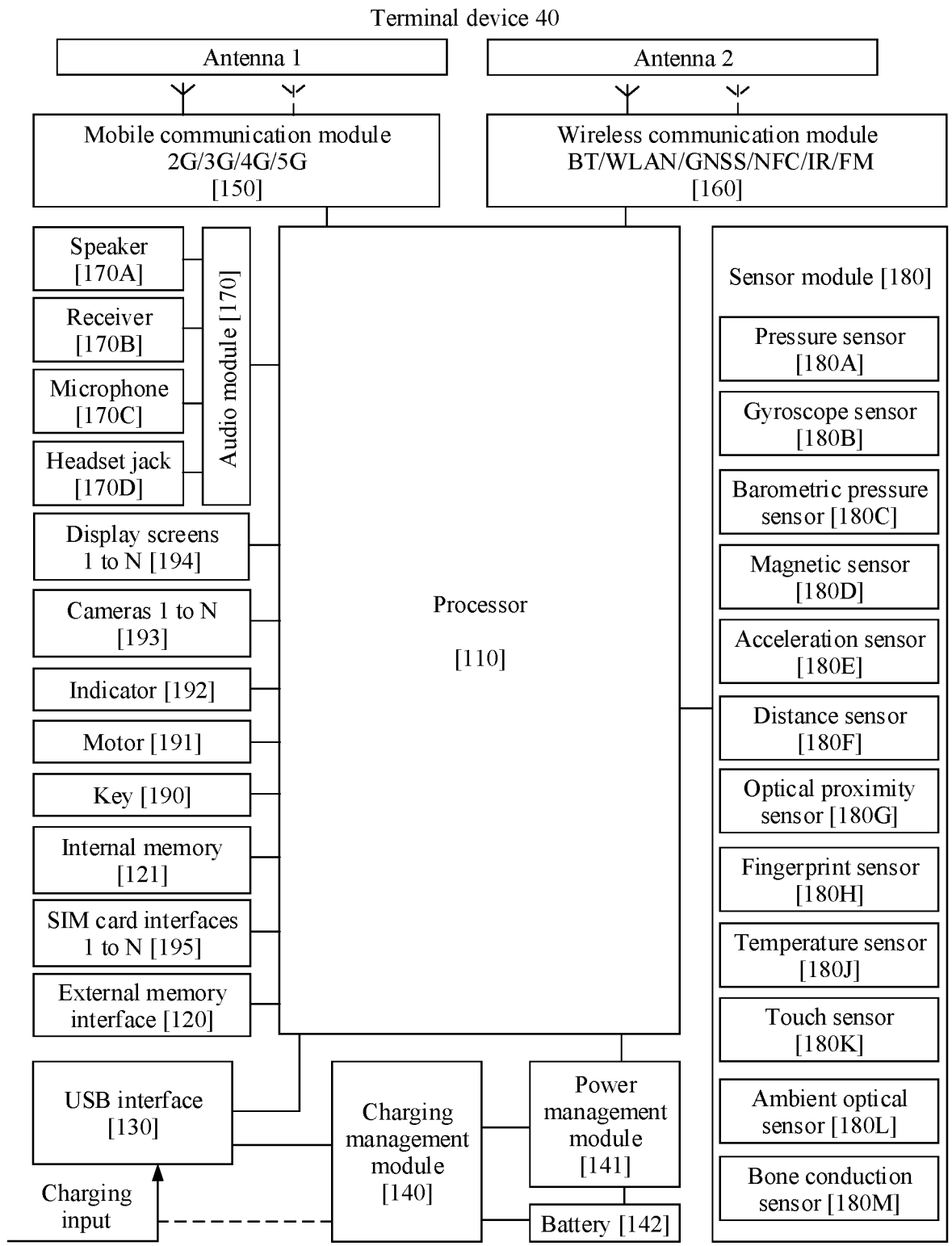
FIG. 4 is a schematic diagram of another structure of a terminal device according to an embodiment of this application.

With reference to the schematic diagram of the structure of the terminal device 40 shown in FIG. 3, for example, FIG. 4 is a specific form of a structure of the terminal device 40 according to an embodiment of this application.

In some embodiments, a function of the processor 401 in FIG. 3 may be implemented by a processor 110 in FIG. 4.

In some embodiments, a function of the transceiver 403 in FIG. 3 may be implemented by using an antenna 1, an antenna 2, a mobile communication module 150, a wireless communication module 160, and the like in FIG. 4.

The antenna 1 and the antenna 2 are configured to transmit and receive an electromagnetic wave signal. Each antenna in the terminal device 40 may be configured to cover one or more communication frequency bands. Different antennas may be further multiplexed, to improve antenna utilization. For example, the antenna 1 may be multiplexed as a diversity antenna in a wireless local area network. In some other embodiments, an antenna may be used in combination with a tuning switch.

The mobile communication module 150 may provide a solution that is used for wireless communication including 2G, 3G, 4G, 5G, and the like and that is applied to the terminal device 40. The mobile communication module 150 may include at least one filter, a switch, a power amplifier, a low noise amplifier (LNA), and the like. The mobile communication module 150 may receive an electromagnetic wave through the antenna 1, perform processing such as filtering or amplification on the received electromagnetic wave, and transmit a processed electromagnetic wave to a modem processor for demodulation. The mobile communication module 150 may further amplify a signal modulated by the modem processor, and convert the signal into an electromagnetic wave for radiation through the antenna 1. In some embodiments, at least some function modules of the mobile communication module 150 may be disposed in the processor 110. In some embodiments, at least some function modules of the mobile communication module 150 and at least some modules of the processor 110 may be disposed in a same device.

The wireless communication module 160 can provide a solution that is applied to the terminal device 40 and that is for wireless communication such as WLAN (for example, a Wi-Fi network), Bluetooth (BT), a global navigation satellite system (GNSS), frequency modulation (FM), near field communication (NFC), and an infrared (IR) technology. The wireless communication module 160 may be one or more devices that integrate at least one communication processing module. The wireless communication module 160 receives an electromagnetic wave through the antenna 2, performs frequency modulation and filtering processing on the electromagnetic wave signal, and sends a processed signal to the processor 110. The wireless communication module 160 may further receive a to-be-sent signal from the processor 110, perform frequency modulation and amplification on the signal, and convert a processed signal into an electromagnetic wave for radiation through the antenna 2. When the terminal device 40 is a first device, that the wireless communication module 160 may provide an NFC wireless communication solution applied to the terminal device 40 means that the first device includes an NFC chip. The NFC chip can improve an NFC wireless communication function. When the terminal device 40 is a second device, that the wireless communication module 160 may provide the NFC wireless communication solution applied to the terminal device 40 means that the first device includes an electronic label (for example, a radio frequency identification (RFID) label). When approaching the electronic label, an NFC chip of another device may perform NFC wireless communication with the second device.

In some embodiments, the antenna 1 of the terminal device 40 is coupled to the mobile communication module 150, and the antenna 2 is coupled to the wireless communication module 160, so that the terminal device 40 can communicate with a network and another device by using a wireless communication technology. The wireless communication technology may include the long term evolution (LTE), the BT, the GNSS, the WLAN, the NFC, the FM, the IR technology, or the like. The GNSS may include a global positioning system (GPS), a global navigation satellite system (GLONASS), a BeiDou navigation satellite system (BDS), a quasi-zenith satellite system (QZSS), or a satellite based augmentation system (SBAS).

In some embodiments, a function of the memory 402 in FIG. 3 may be implemented by using an internal memory 121, an external memory (for example, a Micro SD card) connected to an external memory interface 120 in FIG. 4, or the like.

In some embodiments, a function of the output device 404 in FIG. 3 may be implemented by using a display screen 194 in FIG. 4. The display screen 194 is configured to display an image, a video, and the like. The display screen 194 includes a display panel.

In some embodiments, a function of the input device 405 in FIG. 3 may be implemented by using a mouse, a keyboard, a touchscreen device, or a sensor module 180 in FIG. 4. For example, as shown in FIG. 4, the sensor module 180 may include, for example, one or more of a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient optical sensor 180L, and a bone conduction sensor 180M. This is not specifically limited in this embodiment of this application.

In some embodiments, as shown in FIG. 4, the terminal device 40 may further include one or more of an audio module 170, a camera 193, an indicator 192, a motor 191, a key 190, a SIM card interface 195, a USB interface 130, a charging management module 140, a power management module 141, and a battery 142. The audio module 170 may be connected to a speaker 170A (which is also referred to as a "horn"), a receiver 170B (which is also referred to as an "earpiece"), a microphone 170C (which is also referred to as a "mike" or a "microphone"), a headset jack 170D, or the like. This is not specifically limited in this embodiment of this application.

It may be understood that the structure shown in FIG. 4 does not constitute a specific limitation on the terminal device 40. For example, in some other embodiments of this application, the terminal device 40 may include more or fewer components than those shown in the figure, or some components may be combined, or some components may be split, or the components may be differently arranged. The components shown in the figure may be implemented by hardware, software, or a combination of software and hardware.

With reference to FIG. 2 to FIG. 4, the following describes in detail the communication method provided in the embodiments of this application by using an example, shown in FIG. 2, in which the network device 30 interacts with the any one of the terminal devices 40.

It should be noted that in the following embodiments of this application, names of messages between network elements, names of parameters in messages, or the like are merely examples, and there may be other names during a specific implementation. This is not specifically limited in the embodiments of this application.

Figure 5:
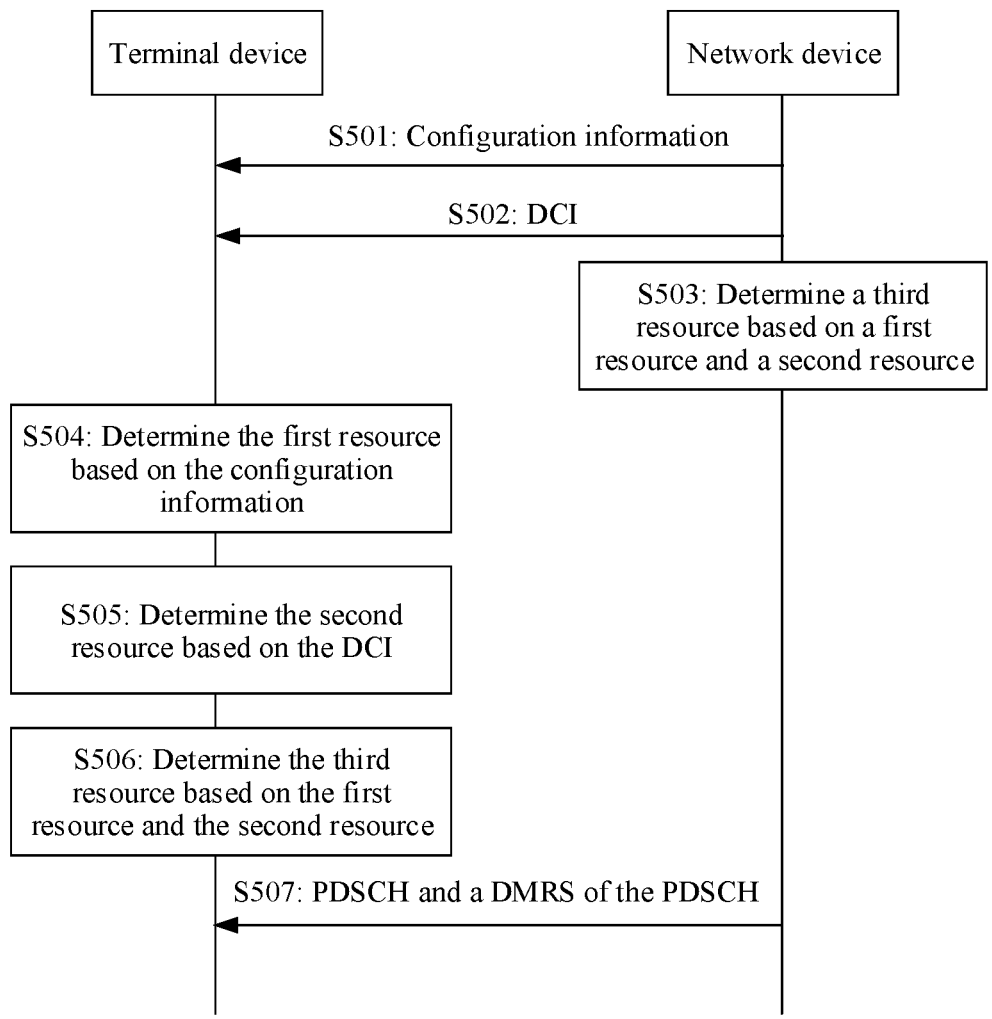
FIG. 5 is a schematic flowchart of a communication method according to an embodiment of this application.

For example, the communication system shown in FIG. 2 is the NR system, a downlink data channel is a PDSCH, and a demodulation reference signal of the downlink data channel is a DMRS of the PDSCH. FIG. 5 shows a communication method according to an embodiment of this application. The communication method includes the following steps S501 to S507.

S501: A network device sends configuration information to a terminal device. The terminal device receives the configuration information from the network device.

The configuration information is used to determine a first resource, and the first resource is a resource that cannot be used to transmit the PDSCH and the DMRS of the PDSCH.

S502: The network device sends DCI to the terminal device. The terminal device receives the DCI from the network device.

The DCI is used to determine a second resource, and the second resource includes a resource used to transmit the PDSCH and the DMRS of the PDSCH.

S503: The network device determines a third resource based on the first resource and the second resource.

The third resource is a resource that is in the second resource and that is used to transmit the PDSCH and the DMRS of the PDSCH.

S504: The terminal device determines the first resource based on the configuration information.

S505: The terminal device determines the second resource based on the DCI.

S506: The terminal device determines the third resource based on the first resource and the second resource.

S507: The network device transmits, on the third resource, the PDSCH and the DMRS of the PDSCH to the terminal device. The terminal device receives, on the third resource, the PDSCH and the DMRS of the PDSCH from the network device.

Optionally, in this embodiment of this application, the network device generally first determines the first resource, and then transmits the configuration information used to determine the first resource to the terminal device. The network device generally first determines the second resource, and then transmits the DCI used to determine the second resource to the terminal device. Descriptions are uniformly provided herein, and details are not described below again.

Optionally, in this embodiment of this application, there is no necessary execution sequence between step S501, step S502, and step S503. Any step may be performed first, and then remaining steps are performed; or two of the steps may be performed first, and then the remaining step is performed. Alternatively, the three steps may be performed at the same time. This is not specifically limited in this embodiment of this application.

Optionally, there is no necessary execution sequence between step S504 and step S505 in this embodiment of this application. Step S504 may be performed first, and then step S505 is performed. Alternatively, step S505 may be performed first, and then step S504 is performed. Alternatively, step S504 and step S505 may be performed at the same time. This is not specifically limited in this embodiment of this application.

In the foregoing steps S501 to S507:

Optionally, in this embodiment of this application, a frequency domain resource in the first resource is N segments of frequency domain resources, and N is a positive integer less than or equal to a third set value. For example, the third set value may be 2, and a value of N may be 1 or 2. If the value of N is 1, it indicates that the frequency domain resource in the first resource is one segment of frequency domain resources. Alternatively, if the value of N is 2, it indicates that the frequency domain resource in the first resource is two segments of frequency domain resources.

Optionally, in this embodiment of this application, each segment of frequency domain resources may include one or a plurality of (including two) RB resources, and the plurality of RB resources herein are consecutive RB resources.

Figure 6A:
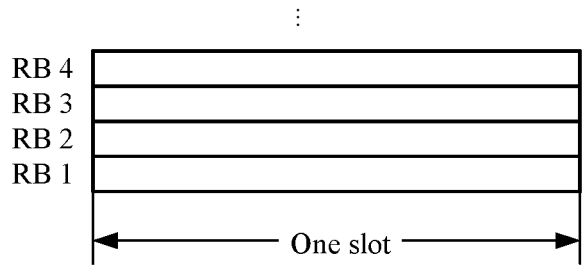
FIG. 6a is a schematic diagram of positions of an RB resource according to an embodiment of this application.

It should be noted that in this embodiment of this application, the consecutive RB resources are frequency domain resources whose sequence numbers are consecutive. For example, as shown in FIG. 6a, an RB 1 resource, an RB 2 resource, and an RB 3 resource may be considered as three consecutive RB resources, and the RB 1 resource and the RB 3 resource may be inconsecutive.

Figure 6B:
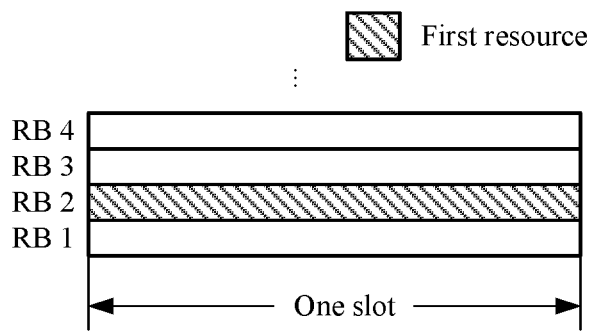
FIG. 6*b* is a schematic diagram 1 of a position of a frequency domain resource in a first resource according to an embodiment of this application.
Figure 6C:
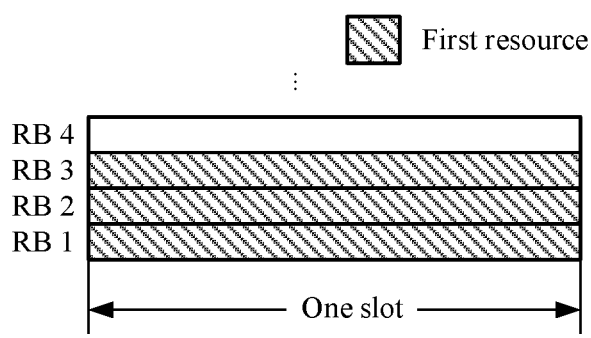
FIG. 6*c* is a schematic diagram 2 of a position of a frequency domain resource in a first resource according to an embodiment of this application.

For example, it is assumed that the frequency domain resource in the first resource is one segment of frequency domain resources. In this case, a schematic diagram of positions of the frequency domain resources in the first resource may be shown in FIG. 6b or FIG. 6c. An example in which the frequency domain resource in the first resource includes one RB resource is used for description in FIG. 6b. An example in which the frequency domain resource in the first resource includes a plurality of consecutive RB resources is used for description in FIG. 6c.

Figure 6D:
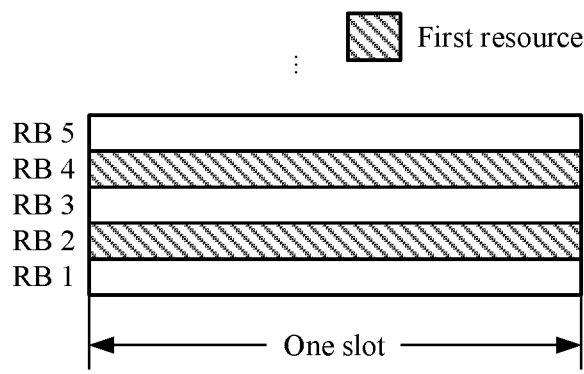
FIG. 6*d* is a schematic diagram 3 of a position of a frequency domain resource in a first resource according to an embodiment of this application.
Figure 6E:
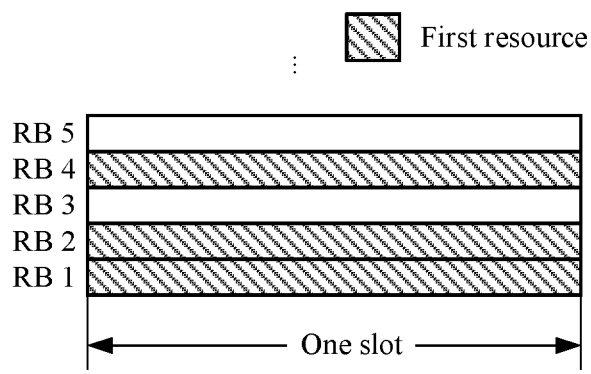
FIG. 6*e* is a schematic diagram 4 of a position of a frequency domain resource in a first resource according to an embodiment of this application.
Figure 6F:
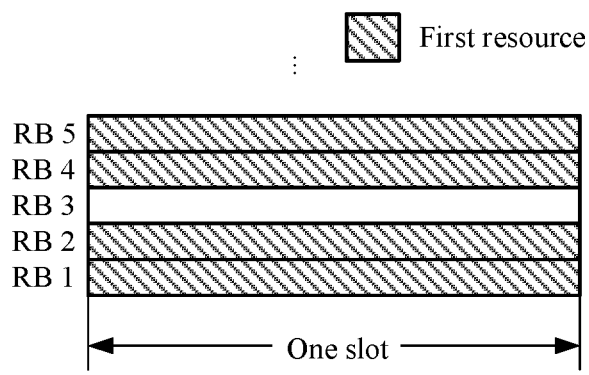
FIG. 6*f* is a schematic diagram 5 of a position of a frequency domain resource in a first resource according to an embodiment of this application.

Alternatively, for example, it is assumed that the frequency domain resource in the first resource is two segments of frequency domain resources. In this case, a schematic diagram of positions of frequency domain resources in the first resource may be shown in FIG. 6d, FIG. 6e, or FIG. 6f. An example in which each frequency domain resource includes one RB resource is used for description in FIG. 6d. An example in which one segment of frequency domain resources includes one RB resource, and one segment of frequency domain resources includes a plurality of consecutive RB resources is used for description in FIG. 6e. An example in which each frequency domain resource includes a plurality of consecutive RB resources is used for description in FIG. 6f.

Optionally, in this embodiment of this application, a time domain resource in the first resource includes all time domain resources (for example, a time domain symbol) within a validity period of the first resource. When the first resource is determined based on the configuration information, after the configuration information is configured, it may be considered that the first resource is within the validity period. When the configuration information is deleted, it may be considered that the first resource is not within the validity period. When the first resource is determined based on the configuration information and the DCI, it may be considered that the first resource is within the validity period is within a time domain range of the PDSCH. Descriptions are uniformly provided herein, and details are not described below again.

Figure 7A:
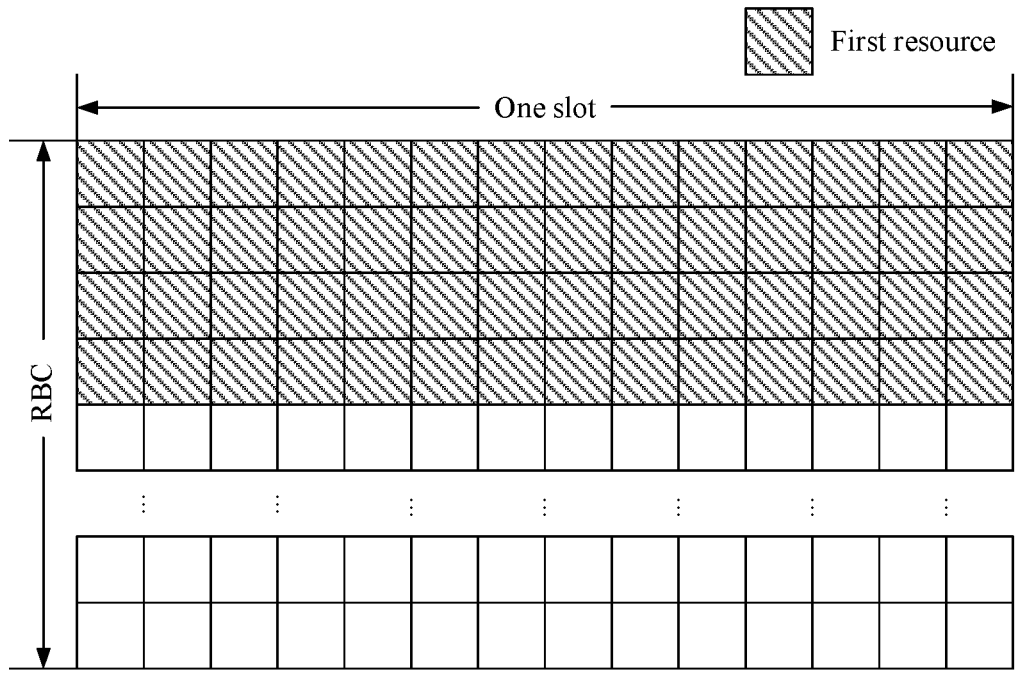
FIG. 7*a* is a schematic diagram 1 of a position of a first resource according to an embodiment of this application.
Figure 7B:
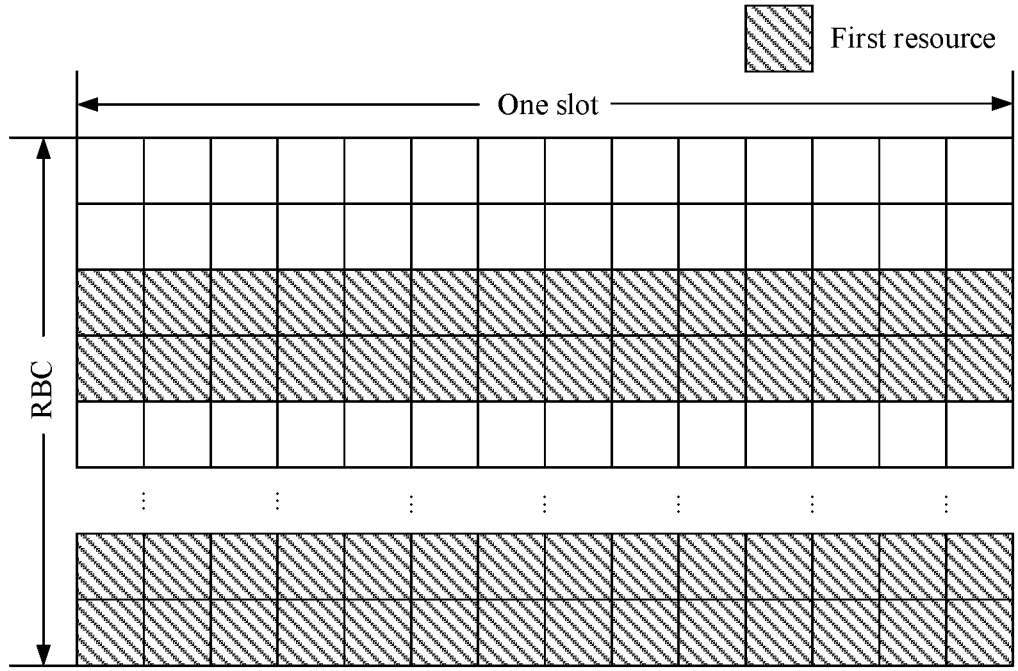
FIG. 7*b* is a schematic diagram 2 of a position of a first resource according to an embodiment of this application.

For example, one RBG in frequency domain and one slot in time domain are used as an example. In this case, a schematic diagram of a position of the first resource may be shown in FIG. 7a or FIG. 7b. The frequency domain resource in the first resource in FIG. 7a is one segment of frequency domain resources, and the frequency domain resource in the first resource in FIG. 7b is two segments of frequency domain resources.

Optionally, the second resource in this embodiment of this application may include a plurality of RB resources. For example, a frequency domain scheduling granularity of the PDSCH may be an RBG corresponding to a frequency domain resource scheduling type 0 of the PDSCH. Alternatively, the frequency domain scheduling granularity of the PDSCH may be one segment of consecutive VRBs of a downlink BWP corresponding to a frequency domain resource scheduling type 1 of the PDSCH. This is not specifically limited in this embodiment of this application.

Optionally, in this embodiment of this application, the third resource is a resource other than an intersection of the first resource and the second resource in the second resource.

Figure 8:
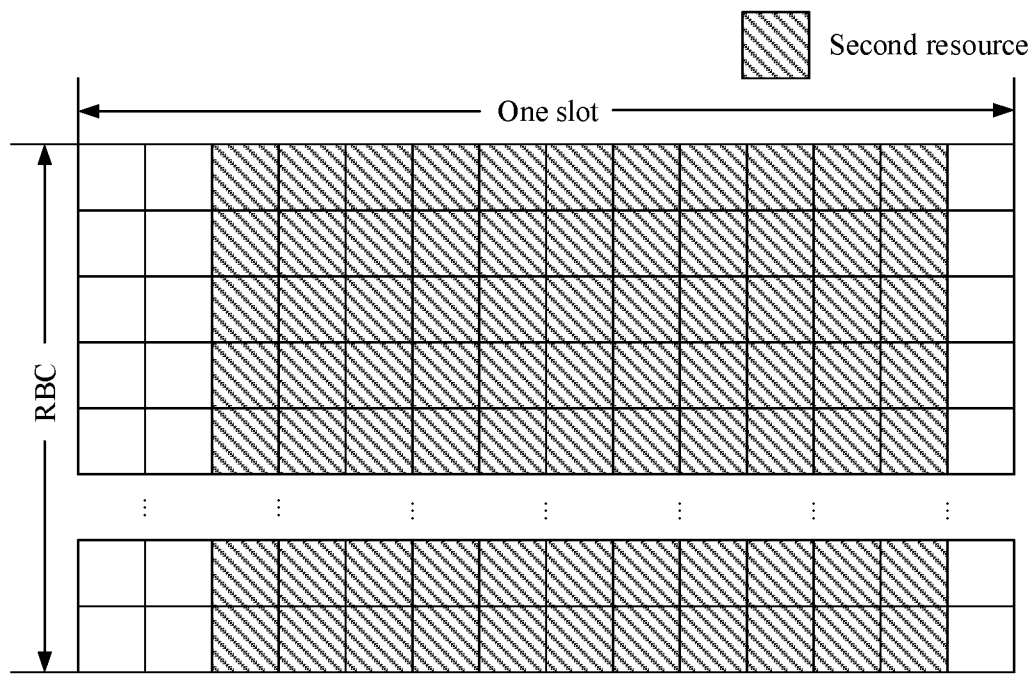
FIG. 8 is a schematic diagram of a position of a second resource according to an embodiment of this application.
Figure 9A:
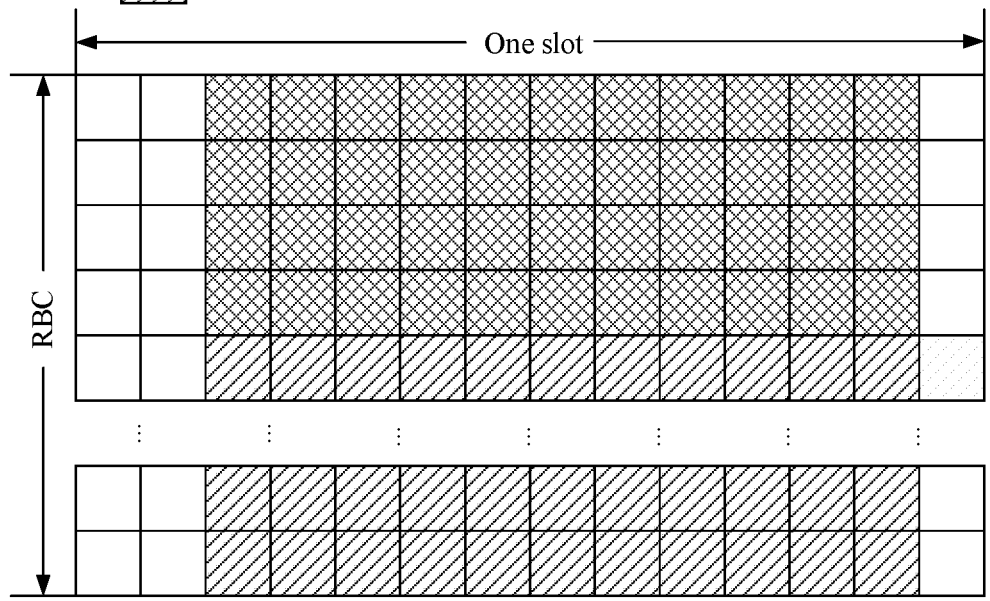
FIG. 9*a* is a schematic diagram 1 of a position of a third resource according to an embodiment of this application.
Figure 9B:
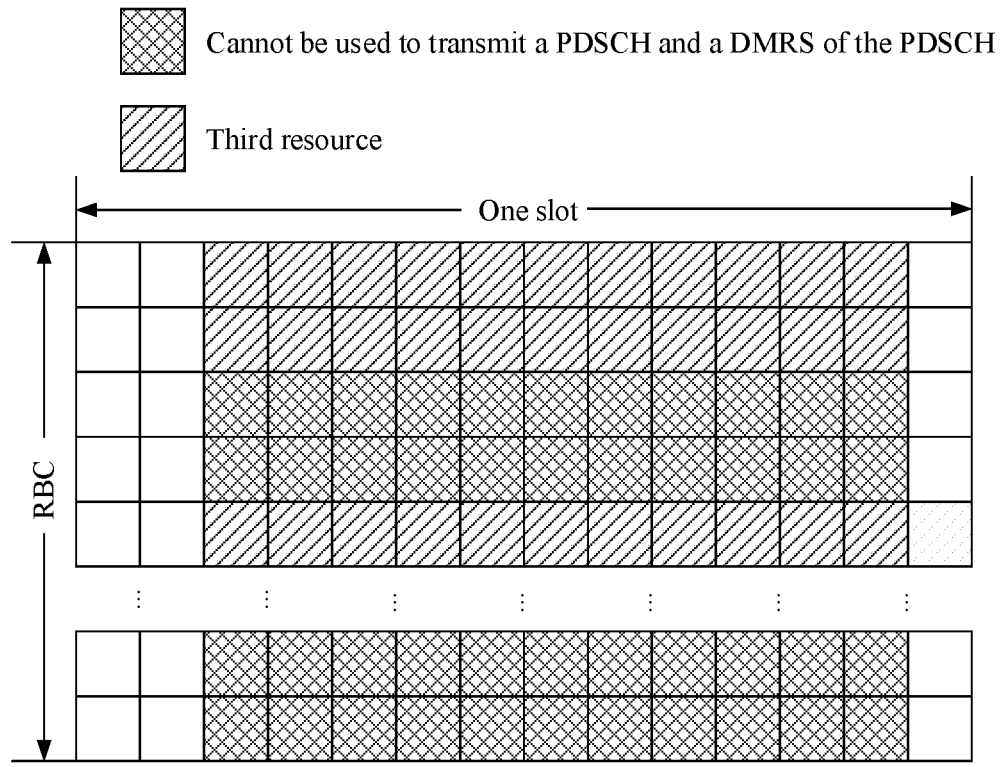
FIG. 9*b* is a schematic diagram 2 of a position of a third resource according to an embodiment of this application.

For example, a time domain mapping manner of the PDSCH is a mapping type A, and the frequency domain resource scheduling type of the PDSCH is the type 0 (namely, the RBG granularity). It is assumed that a start symbol is 2, a quantity of consecutive symbols is 11, and a schematic diagram of a corresponding position of the second resource is shown in FIG. 8. In this case, if the schematic diagram of the position of the first resource is shown in FIG. 7a, a schematic diagram of a position of the third resource may be shown in FIG. 9a. Alternatively, if the schematic diagram of the position of the first resource is shown in FIG. 7b, the schematic diagram of the position of the third resource may be shown in FIG. 9b.

Optionally, in this embodiment of this application, that the terminal device determines the second resource may include: The terminal device determines the second resource based on frequency domain resource assignment information and time domain resource assignment information in the DCI.

Optionally, in this embodiment of this application, that the terminal device determines the first resource may include: The terminal device determines the first resource based on the configuration information.

Alternatively, optionally, in this embodiment of this application, that the terminal device determines the first resource may include: The terminal device determines the first resource based on the configuration information and the DCI. For example, the terminal device determines the first resource based on the configuration information and a rate match indication field in the DCI. The rate match indication field in the DCI indicates whether a resource in a match pattern group can be used to transmit the PDSCH and the DMRS of the PDSCH. The rate match pattern group may include one or more rate match patterns. For example, if a value of a bit corresponding to a rate match pattern group is 1, a resource in the rate match pattern group cannot be used to transmit the PDSCH and the DMRS of the PDSCH. For related descriptions of the rate match pattern in this embodiment of this application, refer to the following content. Details are not described herein again.

Optionally, the configuration information in this embodiment of this application may be configured for the terminal device by using higher layer signaling. The higher layer signaling may be, for example, radio resource control (RRC) signaling, or media access control-control element (MAC-CE) signaling. This is not specifically limited in this embodiment of this application.

For example, the following provides several possible implementations of the configuration information.

In a possible implementation, the configuration information includes indication information of the frequency domain resource in the first resource. The terminal device or the network device considers (for example, as specified in the protocol) that the time domain resource (for example, the time domain symbol) in the first resource includes all the time domain resources within the validity period of the first resource by default.

Optionally, the indication information of the frequency domain resource in the first resource may be, for example, a bitmap mapping with RB level granularity.

For example, it is assumed that values of bits in the bitmap mapping with RB level granularity are 00110 . . . 11. In this case, a schematic diagram of positions of the first resource in a plurality of slots may be shown in FIG. 10a.

Alternatively, for example, it is assumed that the values of bits in the bitmap mapping with RB level granularity are 01110 . . . 00. In this case, a schematic diagram of positions of the first resource in the plurality of slots may be shown in FIG. 10b.

Alternatively, in another possible implementation, the configuration information includes the indication information of the frequency domain resource in the first resource and indication information of the time domain resource in the first resource, where the indication information of the time domain resource is used to indicate that the time domain resource in the first resource includes all the time domain resources within the validity period of the first resource.

Optionally, the indication information of the frequency domain resource in the first resource may be, for example, the bitmap mapping with RB level granularity.

Optionally, the indication information of the time domain resource in the first resource may be, for example, a bitmap mapping with symbol level granularity, values of bits in the bitmap mapping with symbol level granularity are all 1, and values of bits in a periodicity and pattern are all 1 by default (for example, as specified in the protocol).

Alternatively, optionally, the indication information of the time domain resource in the first resource may be, for example, the bitmap mapping with symbol level granularity and the periodicity and pattern, the values of the bits in the bitmap mapping with symbol level granularity and the values of the bits in the periodicity and pattern are all 1.

For example, it is assumed that the values of the bits in the bitmap mapping with RB level granularity are 00110 . . . 11, the values of the bits in the bitmap mapping with symbol level granularity are all 1, and the values of the bits in the periodicity and pattern are all 1. In this case, a schematic diagram of positions of the first resource in the plurality of slots may be shown in FIG. 11a.

Alternatively, for example, it is assumed that the values of the bits in the bitmap mapping with RB level granularity are 01110 . . . 00, the values of the bits in the bitmap mapping with symbol level granularity are all 1, and the values of the bits in the periodicity and pattern are all 1. In this case, a schematic diagram of positions of the first resource in the plurality of slots may be shown in FIG. 11b.

Optionally, in this embodiment of this application, the configuration information is represented by using M rate match patterns, and M is a positive integer less than or equal to a first set value. For example, the first set value may be 2, and a value of M may be 1 or 2. If the value of M is 1, it indicates that the configuration information is represented by using one rate match pattern. Alternatively, if the value of M is 2, it indicates that the configuration information is represented by using two rate match patterns.

Optionally, in this embodiment of this application, if M is greater than 1, frequency domain resources corresponding to the M rate match patterns may overlap, or may completely not overlap. This is not specifically limited in this embodiment of this application.

Optionally, a first rate match pattern in the M rate match patterns includes S segments of frequency domain resources, and S is a positive integer less than or equal to a second set value. For example, the first set value may be 2, and a value of S may be 1 or 2. If the value of S is 1, it indicates that the first rate match pattern includes one segment of frequency domain resources. Alternatively, if the value of S is 2, it indicates that the first rate match pattern includes two segments of frequency domain resources.

Figure 10A:
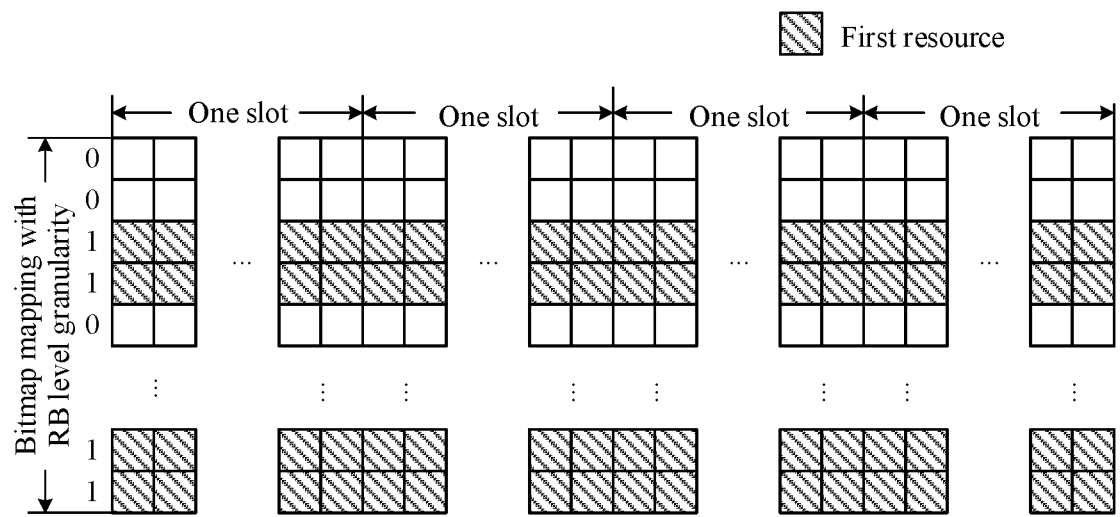
FIG. 10*a* is a schematic diagram 3 of a position of a first resource according to an embodiment of this application.
Figure 10B:
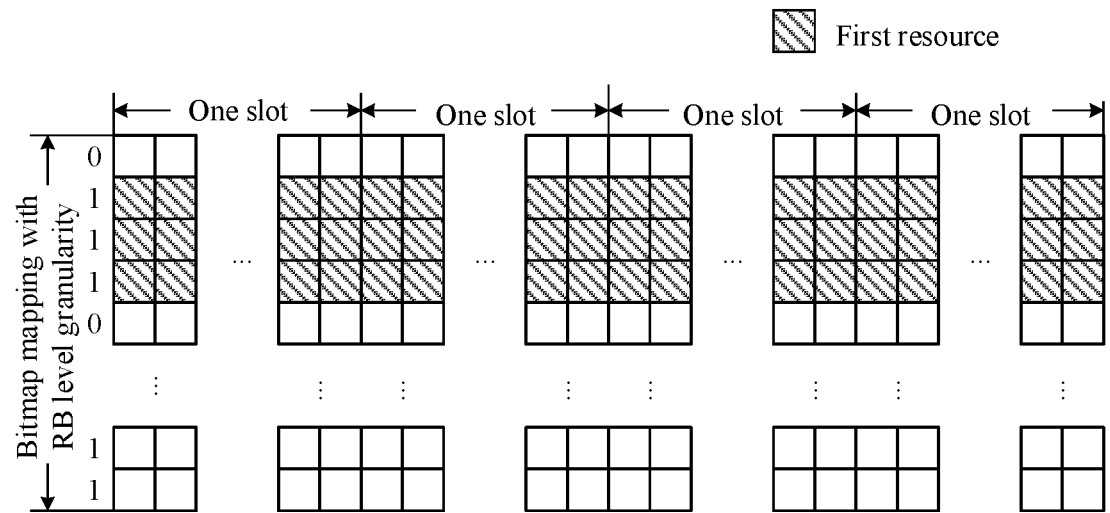
FIG. 10*b* is a schematic diagram 4 of a position of a first resource according to an embodiment of this application.
Figure 11A:
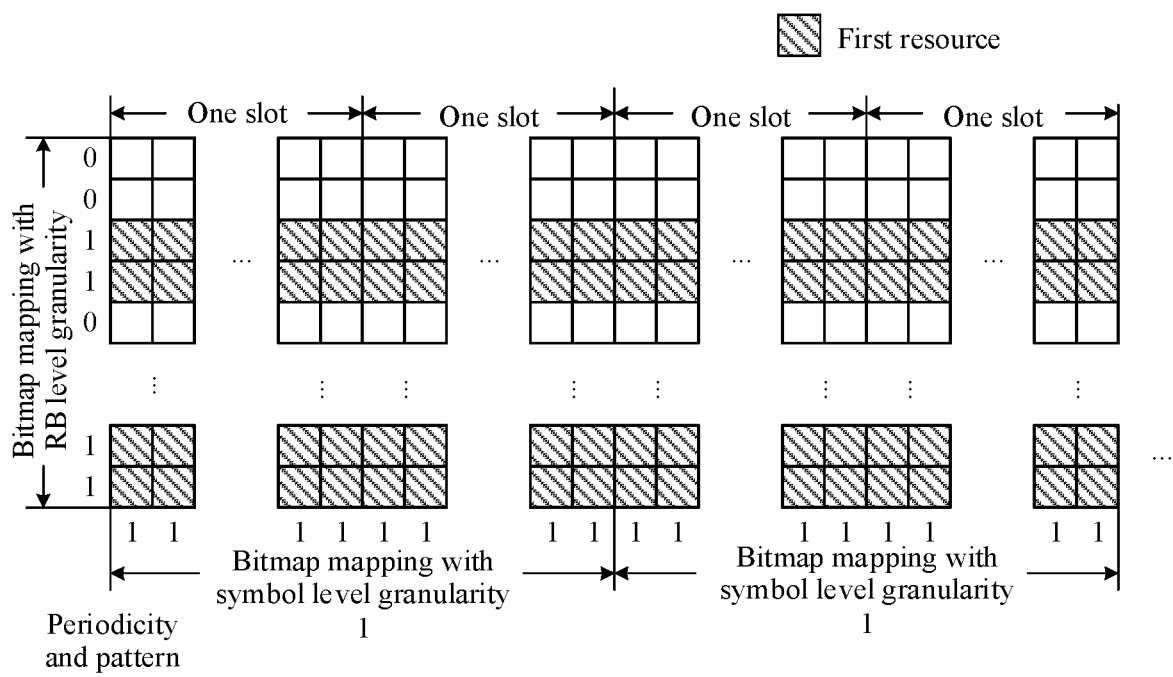
FIG. 11*a* is a schematic diagram 5 of a position of a first resource according to an embodiment of this application.
Figure 11B:
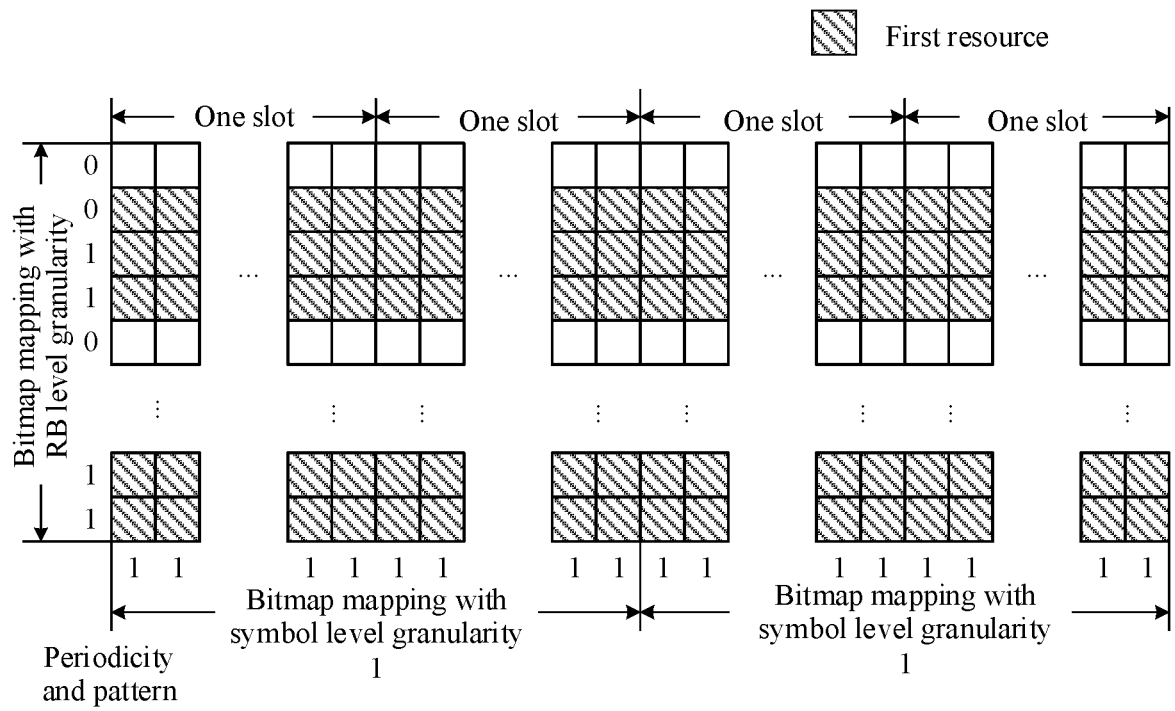
FIG. 11*b* is a schematic diagram 6 of a position of a first resource according to an embodiment of this application.

For example, if M=1 and S=1, the rate match pattern in this embodiment of this application may be shown in FIG. 10b or FIG. 11b.

Alternatively, for example, if M=1 and S=2, the rate match pattern in this embodiment of this application may be shown in FIG. 10a or FIG. 11a.

Certainly, if M=2, each of the two rate match patterns may include one segment of frequency domain resources; or each of the two rate match patterns may include two segments of frequency domain resources; or one of the two rate match patterns includes one segment of frequency domain resource, and the other rate match pattern includes two segments of frequency domain resources. The two rate match patterns may be the same or different. This is not specifically limited in this embodiment of this application.

Optionally, in this embodiment of this application, the first resource is a resource other than resources corresponding to at least one group of rate match patterns, and the resource corresponding to each of the at least one group of rate match patterns is a resource that is indicated by the DCI and that cannot be used to transmit the PDSCH. For example, the first resource may be the resource other than the at least one group of rate match patterns that cannot be used to transmit the PDSCH and that is indicated by the rate match indication field in the existing DCI.

Optionally, the PDSCH in this embodiment of this application belongs to a PDSCH whose mapping type is the type A. In other words, only a DMRS of the PDSCH whose mapping type is the type A may overlap a resource that cannot be used to transmit the PDSCH, and a DMRS of a PDSCH whose mapping type is a type B cannot overlap the resource that cannot be used to transmit the PDSCH. In this case, for processing of the PDSCH whose mapping type is the type B, refer to a solution of the existing protocol. Details are not described herein again.

Alternatively, optionally, the PDSCH in this embodiment of this application belongs to a PDSCH whose mapping type is the type B and whose duration time domain resource length is a fourth set value. In other words, only a DMRS of the PDSCH whose mapping type is the type B and whose duration time domain resource length is the fourth set value may overlap the resource that cannot be used to transmit the PDSCH. A DMRS of a PDSCH whose mapping type is the type B and whose duration time domain resource length is a value other than the fourth set value cannot overlap the resource that cannot be used to transmit the PDSCH. In this case, for processing of the PDSCH whose mapping type is the type B and whose duration time domain resource length is the value other than the fourth set value, refer to a solution in the existing protocol. Details are not described herein again.

For example, the duration time domain resource length herein may be, for example, two time domain symbols.

Optionally, in this embodiment of this application, when a DMRS of the PDSCH is in a double-symbol mode, the DMRS of the double-symbol mode includes at least one group of double-symbol DMRSs. If a fourth resource includes a first DMRS symbol corresponding to one group of double-symbol DMRSs on one RB, but does not include a second DMRS symbol corresponding to the group of double-symbol DMRSs on the RB, the DMRS of the PDSCH cannot be transmitted on the second DMRS symbol. The fourth resource is an intersection of the first resource and the second resource. Optionally, the PDSCH cannot be transmitted on the second DMRS symbol.

In other words, the PDSCH and the DMRS of the PDSCH cannot be transmitted on the second DMRS symbol. Alternatively, the DMRS of the PDSCH cannot be transmitted on the second DMRS symbol, but the PDSCH can be transmitted on the second DMRS symbol.

Optionally, in this embodiment of this application, the first resource includes one symbol in the time domain and all RBs on one BWP in the frequency domain or all RBs on one carrier; or the first resource includes one RB in the frequency domain and all symbols in the time domain. Alternatively, if the first resource includes one RB in the frequency domain and a symbol in the time domain, it is determined that the first resource includes the symbol and all RBs on one BWP in the frequency domain or all RBs on one carrier; or the first resource includes the RB and all symbols in the time domain.

In a possible implementation, in this embodiment of this application, if a resource that is in the second resource and that is used to transmit the DMRS of the PDSCH overlaps the first resource, the terminal device or the network device may determine a PDSCH and a DMRS of the PDSCH that cannot be transmitted within a frequency domain range of an overlapping resource and within duration of the second resource. Alternatively, the terminal device or the network device may determine a DMRS of a PDSCH that cannot be transmitted and a PDSCH that can be transmitted within the frequency domain range of the overlapping resource and within the duration of the second resource.

In another possible implementation, in this embodiment of this application, if the resource that is in the second resource and that is used to transmit the DMRS of the PDSCH overlaps the first resource, the terminal device or the network device may determine a PDSCH and a DMRS of the PDSCH that cannot be transmitted within a time domain range of the overlapping resource and within a frequency domain range of the second resource. Alternatively, the terminal device or the network device may determine a DMRS of a PDSCH that cannot be transmitted and a PDSCH that can be transmitted within the time domain range of the overlapping resource and within the frequency domain range of the second resource.

In other words, in this embodiment of this application, if the resource that is in the second resource and that is used to transmit the DMRS of the PDSCH overlaps the first resource on one symbol of one RB, RBs on an entire BWP on the symbol or RBs on an entire carrier cannot be used to transmit the DMRS of the PDSCH. Optionally, RBs on an entire BWP on the symbol or RBs on an entire carrier cannot be used to transmit the PDSCH. Alternatively, all symbols on the RB cannot be used to transmit the DMRS of the PDSCH, and optionally, cannot be used to transmit the PDSCH.

It should be noted that in the communication method shown in FIG. 5, an example in which the communication system shown in FIG. 2 is the NR system, the downlink data channel is the PDSCH, and the demodulation reference signal of the downlink data channel is the DMRS of the PDSCH is used for description. Certainly, as described above, the solution provided in this embodiment of this application may also be applied to another communication system. For related descriptions, refer to the embodiment shown in FIG. 5. Details are not described herein again.

Figure 12:
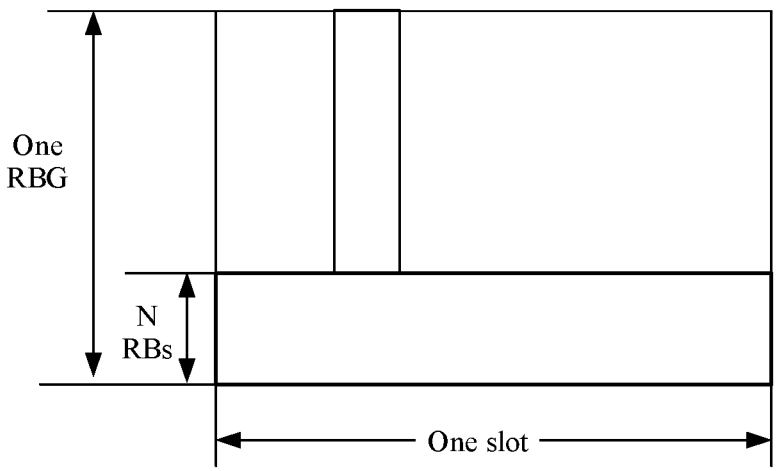
FIG. 12 is a schematic diagram of scheduling of a PDSCH according to an embodiment of this application.

Based on the communication method provided in this embodiment of this application, in the solution, the first resource is the resource that cannot be used to transmit the downlink data channel and the demodulation reference signal of the downlink data channel, the second resource includes the resource used to transmit the downlink data channel scheduled by the DCI and the demodulation reference signal of the downlink data channel, and the third resource is the resource that is in the second resource and that is used to transmit the downlink data channel and the demodulation reference signal of the downlink data channel. Therefore, when a minimum frequency domain scheduling granularity of the downlink data channel is a plurality of RBs, the plurality of RBs may be scheduled, and the downlink data channel and the demodulation reference signal of the downlink data channel are received or transmitted only on the resource that is in the second resource and that is used to transmit the downlink data channel and the demodulation reference signal of the downlink data channel (namely, the third resource). In this way, resource utilization can be improved without affecting reception performance of the downlink data channel. For example, as shown in FIG. 12, by using the communication method provided in this embodiment of this application, the network device may schedule an entire RBG, and transmit the PDSCH and the DMRS of the PDSCH on another RB resource other than N RB resources. The terminal device may receive the PDSCH and the DMRS of the PDSCH on the another RB resource other than the N RB resources, so that resource utilization can be improved without affecting reception performance of the PDSCH.

The processor 301 in the network device 30 shown in FIG. 3 may invoke application program code stored in the memory 302, to indicate the network device to perform actions performed by the network device in steps S501 to S507. The processor 401 in the terminal device 40 shown in FIG. 3 may invoke application program code stored in the memory 402, to indicate the network device to perform actions performed by the terminal device in steps S501 to S507. This is not limited in this embodiment.

It may be understood that, in the foregoing embodiments, the methods and/or steps implemented by the terminal device may alternatively be implemented by a chip system that implements functions of the terminal device, and the methods and/or steps implemented by the network device may alternatively be implemented by a chip system that implements functions of the network device.

The foregoing mainly describes the solutions provided in the embodiments of this application from a perspective of interaction between network elements. Correspondingly, an embodiment of this application further provides a communication apparatus. The communication apparatus is configured to implement the foregoing methods. The communication apparatus may be the terminal device in the foregoing method embodiment or the chip system that implements the functions of the terminal device. Alternatively, the communication apparatus may be the network device in the foregoing method embodiments or the chip system that implements the functions of the network device. It can be understood that, to implement the foregoing functions, the communication apparatus includes a corresponding hardware structure and/or software module for performing the functions. A person skilled in the art should easily be aware that, in combination with units and algorithm steps of the examples described in the embodiments disclosed in this specification, this application may be implemented by hardware or a combination of hardware and computer software. Whether a specific function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the communication apparatus may be divided into functional modules based on the foregoing method embodiments. For example, each functional module may be obtained through division based on each corresponding function, or two or more functions may be integrated into one processing module. The integrated module may be implemented in a form of hardware, or may be implemented in a form of a software functional module. It should be noted that in the embodiments of this application, division into the modules is an example and is merely logical function division, and may be other division manner in an actual implementation.

Figure 13:
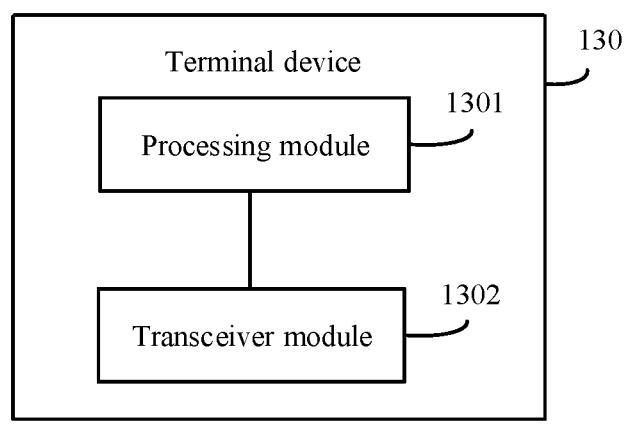
FIG. 13 is a schematic diagram of still another structure of a terminal device according to an embodiment of this application.

For example, the communication apparatus is the terminal device in the foregoing method embodiments. FIG. 13 is a schematic diagram of a structure of a terminal device 130. The terminal device 130 includes a processing module 1301 and a transceiver module 1302. The transceiver module 1302 may alternatively be referred to as a transceiver unit, and is configured to implement a sending function and/or a receiving function, for example, may be a transceiver circuit, a transceiver, or a communication interface.

The transceiver module 1302 is configured to receive configuration information from a network device. The transceiver module 1302 is further configured to receive downlink control information from the network device. The processing module 1301 is configured to determine a first resource based on the configuration information, where the first resource is a resource that cannot be used to transmit a downlink data channel and a demodulation reference signal of the downlink data channel. The processing module 1301 is further configured to determine a second resource based on the downlink control information, where the second resource includes a resource used to transmit the downlink data channel and the demodulation reference signal of the downlink data channel. The processing module 1301 is further configured to determine a third resource based on the first resource and the second resource, where the third resource is a resource that is in the second resource and that is used to transmit the downlink data channel and the demodulation reference signal of the downlink data channel. The transceiver module 1302 is further configured to receive, on the third resource, the downlink data channel from the network device and the demodulation reference signal of the downlink data channel.

All related content of the steps in the foregoing method embodiments may be cited in function descriptions of the corresponding functional modules. Details are not described herein again.

In this embodiment, the terminal device 130 is presented in a form of functional modules obtained through division in an integrated manner. The "module" herein may be a specific ASIC, a circuit, a processor that executes one or more software or firmware programs, a memory, an integrated logic circuit, and/or another component that can provide the foregoing functions. In a simple embodiment, a person skilled in the art may figure out that the terminal device 130 may be in a form of the terminal device 40 shown in FIG. 3.

For example, the processor 401 in the terminal device 40 shown in FIG. 3 may invoke the computer-executable instructions stored in the memory 402, to enable the terminal device 40 to perform the communication methods in the foregoing method embodiments.

Specifically, the processor 401 in the terminal device 40 shown in FIG. 3 may invoke the computer-executable instructions stored in the memory 402, to implement functions/implementation processes of the processing module 1301 and the transceiver module 1302 in FIG. 13. Alternatively, the processor 401 in the terminal device 40 shown in FIG. 3 may invoke the computer-executable instructions stored in the memory 402, to implement functions/implementation processes of the processing module 1301 in FIG. 13, and the transceiver 403 in the terminal device 40 shown in FIG. 3 may implement functions/implementation processes of the transceiver module 1302 in FIG. 13.

Because the terminal device 130 provided in the embodiments may perform the foregoing communication methods, for technical effects that can be achieved by the terminal device 130, refer to the foregoing method embodiments. Details are not described herein again.

Figure 14:
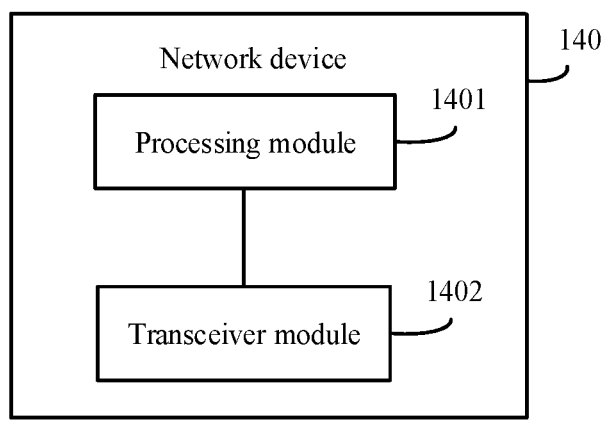
FIG. 14 is a schematic diagram of still another structure of a network device according to an embodiment of this application.

Alternatively, for example, the communication apparatus is the network device in the foregoing method embodiment. FIG. 14 is a schematic diagram of a structure of a network device 140. The network device 140 includes a processing module 1401 and a transceiver module 1402. The transceiver module 1402 may alternatively be referred to as a transceiver unit, and is configured to implement a sending function and/or a receiving function, for example, may be a transceiver circuit, a transceiver, or a communication interface.

The transceiver module 1402 is configured to send configuration information to a terminal device, where the configuration information is used to determine a first resource, and the first resource is a resource that cannot be used to transmit a downlink data channel and a demodulation reference signal of the downlink data channel. The transceiver module 1402 is further configured to send downlink control information to the terminal device, where the downlink control information is used to determine a second resource, and the second resource includes a resource used to transmit the downlink data channel and the demodulation reference signal of the downlink data channel. The processing module 1401 is configured to determine a third resource based on the first resource and the second resource, where the third resource is a resource that is in the second resource and that is used to transmit the downlink data channel and the demodulation reference signal of the downlink data channel. The transceiver module 1402 is further configured to transmit, on the third resource, the downlink data channel and the demodulation reference signal of the downlink data channel to the terminal device.

All related content of the steps in the foregoing method embodiments may be cited in function descriptions of the corresponding functional modules. Details are not described herein again.

In this embodiment, the network device 140 is presented in a form of functional modules obtained through division in an integrated manner. The "module" herein may be a specific ASIC, a circuit, a processor that executes one or more software or firmware programs, a memory, an integrated logic circuit, and/or another component that can provide the foregoing functions. In a simple embodiment, a person skilled in the art may figure out that the network device 140 may be in a form of the network device 30 shown in FIG. 3.

For example, the processor 301 in the network device 30 shown in FIG. 3 may invoke computer-executable instructions stored in the memory 302, to enable the network device 30 to perform the communication methods in the foregoing method embodiments.

Specifically, the processor 301 in the network device 30 shown in FIG. 3 may invoke the computer-executable instructions stored in the memory 302, to implement functions/implementation processes of the processing module 1401 and the transceiver module 1402 in FIG. 14. Alternatively, the processor 301 in the network device 30 shown in FIG. 3 may invoke the computer-executable instructions stored in the memory 302, to implement functions/implementation processes of the processing module 1401 in FIG. 14, and the transceiver 303 in the network device 30 shown in FIG. 3 may implement functions/implementation processes of the transceiver module 1402 in FIG. 14.

Because the network device 140 provided in this embodiment may perform the foregoing communication methods, for technical effects that can be achieved by the network device 140, refer to the foregoing method embodiments. Details are not described herein again.

Optionally, an embodiment of this application further provides a communication apparatus (for example, the communication apparatus may be a chip or a chip system). The communication apparatus includes a processor, configured to implement the method in any one of the foregoing method embodiments. In a possible design, the communication apparatus further includes a memory. The memory is configured to store necessary program instructions and data. The processor may invoke program code stored in the memory, to indicate the communication apparatus to perform the method in any one of the foregoing method embodiments. Certainly, the memory may not be in the communication apparatus. When the communication apparatus is the chip system, the communication apparatus may include a chip, or may include a chip and another discrete component. This is not specifically limited in this embodiment of this application.

All or some of the foregoing embodiments may be implemented by using software, hardware, firmware, or any combination thereof. When a software program is used to implement the embodiments, all or some of the embodiments may be implemented in a form of a computer program product. The computer program product includes one or more computer instructions. When the computer program instructions are loaded and executed on a computer, the procedures or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state disk (SSD)), or the like. In this embodiment of this application, the computer may include the foregoing apparatus.

Although this application is described with reference to the embodiments, in a process of implementing this application that claims protection, a person skilled in the art may understand and implement other variations of the disclosed embodiments by viewing the accompanying drawings, disclosed content, and the appended claims. In the claims, "comprise" (comprising) does not exclude another component or another step, and "a" or "one" does not exclude a meaning of plurality. A single processor or another unit may implement several functions enumerated in the claims. Some measures are recorded in dependent claims that are different from each other, but this does not mean that these measures cannot be combined to produce a better effect.

Although this application is described with reference to specific features and the embodiments thereof, it is clear that various modifications and combinations may be made to them without departing from the spirit and scope of this application. Correspondingly, the specification and accompanying drawings are merely descriptions of examples of this application defined by the appended claims, and are considered as any of or all modifications, variations, combinations, or equivalents that cover the scope of this application. It is clear that a person skilled in the art can make various modifications and variations to this application without departing from the spirit and scope of this application. This application is intended to cover these modifications and variations of this application provided that they fall within the scope of protection defined by the following claims of this application and their equivalent technologies.

What is claimed is:

1. A communication method, wherein the method comprises:
receiving, by a terminal device in a wireless communication system, configuration information from a network device in the wireless communication system;
receiving, by the terminal device, downlink control information (DCI) from the network device;
determining, by the terminal device, a first resource based on the configuration information, wherein the first resource is a resource that cannot be used in the wireless communication system to transmit a downlink data channel and a demodulation reference signal (DMRS) of the downlink data channel;
determining, by the terminal device, a second resource based on the DCI, wherein the second resource comprises a resource used to transmit the downlink data channel and the DMRS of the downlink data channel;
determining, by the terminal device, a third resource based on the first resource and the second resource, wherein the third resource is used to transmit the downlink data channel and the DMRS of the downlink data channel, and the third resource is a resource in the second resource other than an intersection of the first resource and the second resource; and
receiving, by the terminal device on the third resource, the downlink data channel and the DMRS of the downlink data channel from the network device.

2. The method according to claim 1, wherein the determining, by the terminal device, a first resource based on the configuration information comprises:
determining, by the terminal device, the first resource based on the configuration information and the DCI.

3. The method according to claim 1, wherein the configuration information comprises indication information of a frequency domain resource in the first resource, and a time domain resource in the first resource comprises all time domain resources within a validity period of the first resource.

4. The method according to claim 1, wherein the configuration information comprises indication information of a frequency domain resource in the first resource and indication information of a time domain resource in the first resource, and the indication information of the time domain resource is used to indicate that the time domain resource in the first resource comprises all time domain resources within a validity period of the first resource.

5. The method according to claim 1, wherein the configuration information is represented by using M rate match patterns, and M is a positive integer less than or equal to a first set value.

6. The method according to claim 5, wherein a first rate match pattern in the M rate match patterns comprises S segments of frequency domain resources, and S is a positive integer less than or equal to a second set value.

7. The method according to claim 1, wherein a frequency domain resource in the first resource is N segments of frequency domain resources, and N is a positive integer less than or equal to a third set value.

8. A terminal device, comprising at least one processor and one or more memories coupled to the at least one processor and storing programming instructions for execution by the at least one processor to cause the terminal device in a wireless communication system to perform operations of:
receiving configuration information from a network device in the wireless communication system;
receiving downlink control information (DCI) from the network device;
determining a first resource based on the configuration information, wherein the first resource is a resource that cannot be used in the wireless communication system to transmit a downlink data channel and a demodulation reference signal (DMRS) of the downlink data channel;
determining a second resource based on the DCI, wherein the second resource comprises a resource used to transmit the downlink data channel and the DMRS of the downlink data channel;
determining a third resource based on the first resource and the second resource, wherein the third resource is used to transmit the downlink data channel and the DMRS of the downlink data channel, and the third resource is a resource in the second resource other than an intersection of the first resource and the second resource; and
receiving, on the third resource, the downlink data channel and the DMRS of the downlink data channel from the network device.

9. The device according to claim 8, wherein the determining a first resource based on the configuration information comprises:
determining the first resource based on the configuration information and the DCI.

10. The device according to claim 8, wherein the configuration information comprises indication information of a frequency domain resource in the first resource, and a time domain resource in the first resource comprises all time domain resources within a validity period of the first resource.

11. The device according to claim 8, wherein the configuration information comprises indication information of a frequency domain resource in the first resource and indication information of a time domain resource in the first resource, and the indication information of the time domain resource is used to indicate that the time domain resource in the first resource comprises all time domain resources within a validity period of the first resource.

12. The device according to claim 8, wherein the configuration information is represented by using M rate match patterns, and M is a positive integer less than or equal to a first set value.

13. The device according to claim 12, wherein a first rate match pattern in the M rate match patterns comprises S segments of frequency domain resources, and S is a positive integer less than or equal to a second set value.

14. The device according to claim 8, wherein a frequency domain resource in the first resource is N segments of frequency domain resources, and N is a positive integer less than or equal to a third set value.

15. A network device, comprising at least one processor and one or more memories coupled to the at least one processor and storing programming instructions for execution by the at least one processor to cause the network device in a wireless communication system to perform operations of:
sending configuration information to a terminal device in the wireless communication system, wherein the configuration information is used to determine a first resource, and the first resource is a resource that cannot be used in the wireless communication system to transmit a downlink data channel and a demodulation reference signal (DMRS) of the downlink data channel;

sending downlink control information (DCI) to the terminal device, wherein the DCI is used to determine a second resource, and the second resource comprises a resource used to transmit the downlink data channel and the DMRS of the downlink data channel;

determining a third resource based on the first resource and the second resource, wherein the third resource is used to transmit the downlink data channel and the DMRS of the downlink data channel, and the third resource is a resource in the second resource other than an intersection of the first resource and the second resource; and transmitting, on the third resource, the downlink data channel and the DMRS of the downlink data channel to the terminal device.

16. The device according to claim 15, wherein the DCI is further used to determine the first resource.

17. The device according to claim 15, wherein the configuration information comprises indication information of a frequency domain resource in the first resource, and a time domain resource in the first resource comprises all time domain resources within a validity period of the first resource.

18. The device according to claim 15, wherein the configuration information comprises indication information of a frequency domain resource in the first resource and indication information of a time domain resource in the first resource, and the indication information of the time domain resource is used to indicate that the time domain resource in the first resource comprises all time domain resources within a validity period of the first resource.

19. The device according to claim 15, wherein the configuration information is represented by using M rate match patterns, and M is a positive integer less than or equal to a first set value.

20. The device according to claim 19, wherein a first rate match pattern in the M rate match patterns comprises S segments of frequency domain resources, and S is a positive integer less than or equal to a second set value.

* * * * *